US012570320B2

(12) United States Patent
Min et al.

(10) Patent No.: US 12,570,320 B2
(45) Date of Patent: Mar. 10, 2026

(54) VEHICLE FOR PERFORMING MINIMAL RISK MANEUVER DURING AUTONOMOUS DRIVING AND METHOD OF OPERATING THE VEHICLE

(71) Applicants: Hyundai Motor Company, Seoul (KR); Kia Corporation, Seoul (KR); AJOU UNIVERSITY INDUSTRY-ACADEMIC COOPERATION FOUNDATION, Gyeonggi-do (KR)

(72) Inventors: Young Bin Min, Busan (KR); Jong Sung Park, Gyeonggi-do (KR); Bong Sob Song, Gyeonggi-do (KR); Ji Min Lee, Gyeonggi-do (KR); Sung Woo Lee, Gyeonggi-do (KR)

(73) Assignees: Hyundai Motor Company, Seoul (KR); Kia Corporation, Seoul (KR); Ajou University Industry-Academic Cooperation Foundation, Suwon (KR)

( * ) Notice: Subject to any disclaimer, the term of this patent is extended or adjusted under 35 U.S.C. 154(b) by 228 days.

(21) Appl. No.: 18/243,954

(22) Filed: Sep. 8, 2023

(65) Prior Publication Data

US 2024/0083461 A1    Mar. 14, 2024

(30) Foreign Application Priority Data

Sep. 8, 2022    (KR) ........................ 10-2022-0113973

(51) Int. Cl.
*B60W 60/00* (2020.01)

(52) U.S. Cl.
CPC ... *B60W 60/0015* (2020.02); *B60W 2530/201* (2020.02); *B60W 2552/00* (2020.02); *B60W 2554/801* (2020.02); *B60W 2554/802* (2020.02); *B60W 2754/20* (2020.02); *B60W 2754/30* (2020.02)

(58) Field of Classification Search
CPC ....... B60W 60/0015; B60W 2530/201; B60W 2552/00; B60W 2554/801; B60W 2554/802; B60W 2754/20; B60W 2754/30; B60W 50/14; B60W 2552/53; B60W 30/09; B60W 60/0053; B60W 30/0956; B60W 30/095; B60W 30/0953; B60W 30/18109; B60W 60/0018; B60W 40/02;

(Continued)

(56) References Cited

U.S. PATENT DOCUMENTS

2010/0228419 A1* 9/2010 Lee ...................... G05D 1/0246
                                                            701/25
2020/0207355 A1* 7/2020 Ishioka .................. G08G 1/167

(Continued)

*Primary Examiner* — Jelani A Smith
*Assistant Examiner* — Alyssa Rorie
(74) *Attorney, Agent, or Firm* — Fox Rothschild LLP

(57) ABSTRACT

A vehicle for autonomous driving is capable of performing a minimum risk maneuver. The vehicle includes: at least one sensor, a processor and a controller, where the processor may detect whether a minimum risk maneuver (MRM) is required based on at least one of surrounding environment information and vehicle state information during autonomous driving of the vehicle, determine an MRM type based on a possibility of colliding with a neighboring vehicle when the MRM is required, and control to stop the vehicle based on the determined MRM type.

18 Claims, 13 Drawing Sheets

| Category | Traffic Lane Stop (301) | | Road Shoulder Stop (303) | |
|---|---|---|---|---|
| Classification | TYPE 1 | TYPE 2 | TYPE 3 | TYPE 4 |
| | Straight stop (311) | In-lane Stop (312) | Half-shoulder Stop (313) | Full-shoulder Stop (314) |
| Description | | | | |
| Lateral Control (321) | NOT Required | Required | Required | Required |
| Powertrain Control (322) | NOT Required | NOT Required | Optional | Optional |
| Brake Control (323) | Required | Required | Required | Required |
| Lane Change (324) | NOT Required | NOT Required | Required | Required |
| Detection of potential stopping locations out of traffic lanes (325) | NOT Required | NOT Required | Required | Required |

(58) Field of Classification Search
CPC .. B60W 40/12; B60W 2552/20; B60W 30/08;
B60W 60/00; B60Y 2300/09
See application file for complete search history.

(56)                    References Cited

U.S. PATENT DOCUMENTS

| | | | | |
|---|---|---|---|---|
| 2020/0310418 | A1* | 10/2020 | Kanoh | B62D 15/0285 |
| 2021/0229658 | A1* | 7/2021 | Tsuji | B60W 60/0016 |
| 2021/0229683 | A1* | 7/2021 | Aoyagi | B60W 60/0018 |
| 2021/0294336 | A1* | 9/2021 | Maus | G05D 1/0214 |
| 2022/0410877 | A1* | 12/2022 | Ishida | B60W 40/12 |
| 2023/0174115 | A1* | 6/2023 | Fei | B60W 60/0015 |
| 2023/0391333 | A1* | 12/2023 | Baba | B60W 30/09 |
| 2025/0065919 | A1* | 2/2025 | Yu | G07C 5/008 |

* cited by examiner

Figure 2:
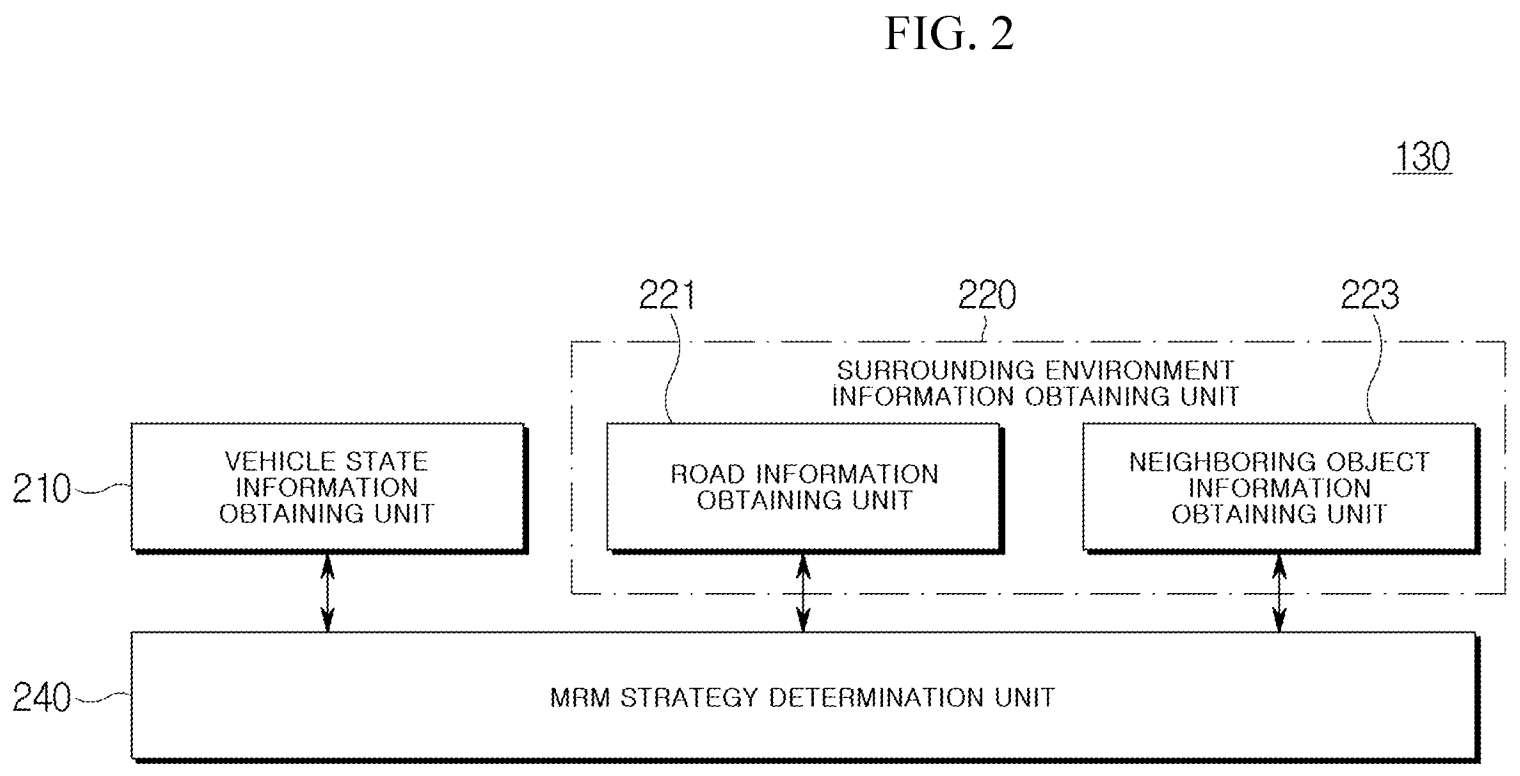

SURROUNDING ENVIRONMENT
INFORMATION OBTAINING UNIT

220

223

NEIGHBORING OBJECT
INFORMATION
OBTAINING UNIT

221

ROAD INFORMATION
OBTAINING UNIT

210

VEHICLE STATE
INFORMATION
OBTAINING UNIT

240

MRM STRATEGY DETERMINATION UNIT

FIG. 3

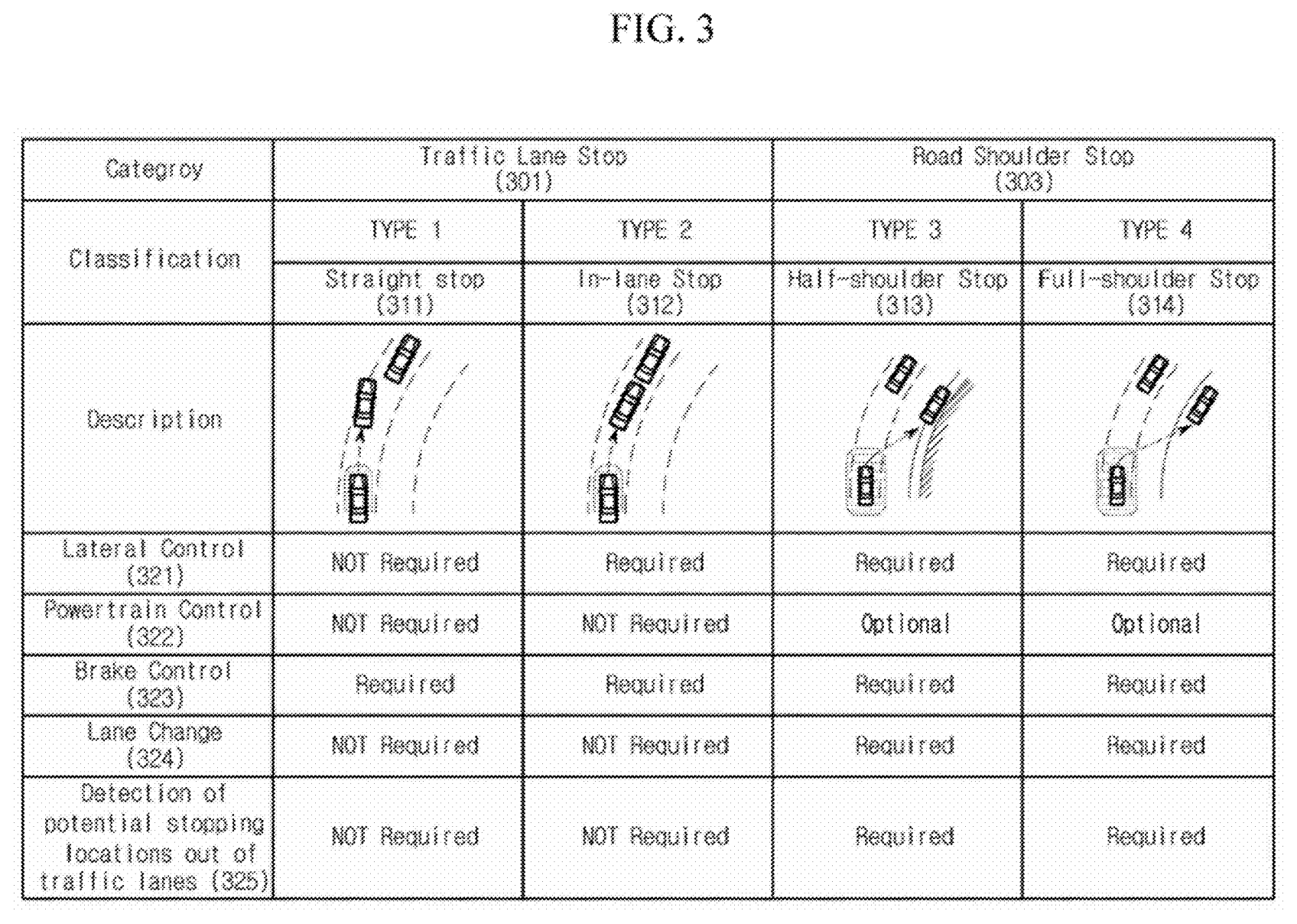

| Category | | Traffic Lane Stop (301) | | Road Shoulder Stop (303) | |
|---|---|---|---|---|---|
| Classification | | TYPE 1 | TYPE 2 | TYPE 3 | TYPE 4 |
| Description | | Straight stop (311) | In-lane Stop (312) | Half-shoulder Stop (313) | Full-shoulder Stop (314) |
| Lateral Control (321) | | NOT Required | Required | Required | Required |
| Powertrain Control (322) | | NOT Required | NOT Required | Optional | Optional |
| Brake Control (323) | | Required | Required | Required | Required |
| Lane Change (324) | | NOT Required | NOT Required | Required | Required |
| Detection of potential stopping locations out of traffic lanes (325) | | NOT Required | NOT Required | Required | Required |

RSSx > 0
RSSy < 0

VEHICLE FOR PERFORMING MINIMAL RISK MANEUVER DURING AUTONOMOUS DRIVING AND METHOD OF OPERATING THE VEHICLE

CROSS-REFERENCE TO RELATED APPLICATION(S)

The present application claims under 35 U.S.C. § 119(a) the benefit of Korean Patent Application No. 10-2022-0113973, filed on Sep. 8, 2022 in the Korean Intellectual Property Office, the entire contents of which are incorporated herein by reference.

BACKGROUND

(a) Technical Field

The present disclosure relates to a vehicle for performing a minimum risk maneuver during autonomous driving, and a method for operating the vehicle.

(b) Description of the Related Art

Advanced driver assistance systems (ADAS) have been developed to assist drivers in driving a vehicle, e.g., under autonomous control. ADAS includes multiple sub-classifications and provides convenience to the driver. ADAS may also be referred to as autonomous driving or ADS (Automated Driving System).

Meanwhile, an abnormality may occur in an autonomous driving system while a vehicle performs autonomous driving. The vehicle may enter a dangerous state if appropriate measures are not taken to rectify the abnormality in the autonomous driving system.

SUMMARY

Accordingly, various embodiments of the present disclosure disclose a vehicle that performs a minimal risk maneuver (MRM) to remove (or reduce) a risk and a method for operating the vehicle when a situation in which normal autonomous driving is impossible is detected during autonomous driving.

Various embodiments of the present disclosure provide a method for determining a minimum risk maneuver strategy based on vehicle state information or surrounding environment information, when a situation in which normal autonomous driving is impossible is detected during autonomous driving.

Various embodiments of the present disclosure provide a method and an apparatus for determining a minimum risk maneuver strategy considering a surrounding environment, when a situation in which normal autonomous driving is impossible is detected during autonomous driving.

One embodiment is an autonomous driving vehicle including: at least one sensor detecting surrounding environment of the vehicle and generating surrounding environment information; a processor monitoring state of the vehicle to generate vehicle state information and controlling autonomous driving of the vehicle; and a controller controlling operation of the vehicle according to control of the processor. Further, the processor may detect whether a minimum risk maneuver (MRM) is required or not based on at least one of the surrounding environment information or the vehicle state information during autonomous driving of the vehicle, determine an MRM type based on a possibility of colliding with a neighboring vehicle when the MRM is required, and control to stop the vehicle based on the determined MRM type.

According to the embodiment, when the MRM is required, the processor may determine MRM types possible to be performed based on the vehicle state information and the surrounding environment information, when a plurality of the MRM types are possible to be performed, the processor may determine the possibility of colliding with the neighboring vehicle with respect to a first MRM type having a highest priority among the plurality of the MRM types, when it is determined that there is no possibility of colliding with the neighboring vehicle, the processor may determine the first MRM type as an MRM type to be performed, and when it is determined that there is the possibility of colliding with the neighboring vehicle, the processor may determine another MRM type having a lower priority than the first MRM type as an MRM type to be performed.

According to the embodiment, the processor may calculate a longitudinal safe distance and a lateral safe distance to the neighboring vehicle, and determine a possibility of colliding with the neighboring vehicle based on the longitudinal safe distance and the lateral safe distance, and the longitudinal safe distance may be calculated as a difference between a minimum longitudinal relative distance to be maintained to the neighboring vehicle and an actual longitudinal relative distance to the neighboring vehicle, and the lateral safe distance may be calculated as a difference between a minimum lateral relative distance to be maintained to the neighboring vehicle and an actual lateral relative distance to the neighboring vehicle.

According to the embodiment, the neighboring vehicle may be a neighboring vehicle located in front of or on a front-lateral side of the vehicle.

According to the embodiment, the minimum longitudinal relative distance and the minimum lateral relative distance to be maintained to the neighboring vehicle located in front or on a front-lateral side of the vehicle may be set greater than the minimum longitudinal relative distance and the minimum lateral relative distance to be maintained to a neighboring vehicle located on a rear side or on a rear lateral side of the vehicle.

According to the embodiment, the autonomous driving vehicle may further include: a memory, and the processor may store the calculated longitudinal safe distance and lateral safe distance in the memory as base data for determination of the MRM to be performed.

According to the embodiment, the processor may determine the MRM type possible to be performed within a designated range based on the vehicle state information and the surrounding environment information.

According to the embodiment, the processor may determine whether lateral control is possible or not based on the vehicle state information, and determine a straight stop type as the MRM type possible to be performed when the lateral control is impossible.

According to the embodiment, when the lateral control is possible, the processor may determine the MRM type possible to be performed based on at least one of presence of a shoulder of a road within the designated range, a size of a shoulder of a road, or a possibility of lane detection.

According to the embodiment, the processor may determine whether the lane detection is possible or not, when there is no shoulder of a road within the designated range; determine a straight stop type as the MRM type possible to be performed, when the lane detection is impossible; and determine an in-lane stop and the straight stop type as the MRM types possible to be performed, when the lane detection is possible.

According to the embodiment, the processor may compare a size of the shoulder of a road with a size of the vehicle when there is the shoulder of a road within the designated range; determine a half-shoulder stop type, the in-lane stop type and the straight stop type as the MRM types possible to be performed when a size of the shoulder of a road is smaller than a size of the vehicle; and determine a full-shoulder stop type, the half-shoulder stop type, the in-lane stop type and the straight stop type as the MRM types possible to be performed when a size of the shoulder of a road is smaller than a size of the vehicle.

According to the embodiment, the autonomous driving vehicle may further include a memory, and the processor may store information of at least one of the possibility of the lateral control, the presence of the shoulder of a road, the size of the shoulder of a road, or the possibility of lane detection in the memory.

Another embodiment is a method for operating an autonomous driving vehicle including: obtaining surrounding environment information by detecting a surrounding environment of the vehicle during an autonomous driving of the vehicle; obtaining vehicle state information by monitoring a state of the vehicle during the autonomous driving of the vehicle; detecting whether a minimum risk maneuver (MRM) is required or not based on at least one of the surrounding environment information or the vehicle state information during the autonomous driving of the vehicle; determining an MRM type based on a possibility of colliding with a neighboring vehicle when the MRM is required; and controlling the vehicle to stop based on the determined MRM type.

According to the embodiment, the determining an MRM type may include: determining an MRM type possible to be performed based on the vehicle state information and the surrounding environment information; when a plurality of the MRM types are possible to be performed, determining the possibility of colliding with the neighboring vehicle with respect to a first MRM type having a highest priority among the plurality of the MRM types; when it is determined that there is no possibility of colliding with a neighboring vehicle, determining the first MRM type as an MRM type to be performed; and when it is determined that there is the possibility of colliding with the neighboring vehicle, determining another MRM type having a lower priority than the first MRM type as an MRM type to be performed.

According to the embodiment, the determining the possibility of colliding with the neighboring vehicle may include: calculating the longitudinal safe distance and the lateral safe distance to the neighboring vehicle; and determining the possibility of colliding with the neighboring vehicle based on the longitudinal safe distance and the lateral safe distance, and the longitudinal safe distance may be calculated as a difference between a minimum longitudinal relative distance to be maintained to the neighboring vehicle and an actual longitudinal relative distance to the neighboring vehicle, and the lateral safe distance may be calculated as a difference between a minimum lateral relative distance to be maintained to the neighboring vehicle and an actual lateral relative distance to the neighboring vehicle.

According to the embodiment, the method may further include: storing the calculated longitudinal safe distance and lateral safe distance in the memory as base data for determination of the MRM type to be performed.

According to the embodiment, the determining an MRM type possible to be performed based on the vehicle state information and the surrounding environment information may include: determining the MRM type possible to be performed within a designated range based on the vehicle state information and the surrounding environment information.

According to the embodiment, the determining the MRM type possible to be performed within the designated range may include: determining whether lateral control is possible or not based on the vehicle state information; and determining a straight stop type as the MRM type possible to be performed when the lateral control is impossible.

According to the embodiment, the method may further include, when the lateral control is possible, determining the MRM type possible to be performed based on at least one of presence of a shoulder of a road within the designated range, a size of a shoulder of a road, or a possibility of lane detection.

According to the embodiment, the determining the MRM type possible to be performed based on at least one of presence of a shoulder of a road within the designated range, a size of a shoulder of a road, or a possibility of lane detection may include: determining whether the lane detection is possible or not, when there is no shoulder of a road within the designated range; determining a straight stop type as the MRM type possible to be performed, when the lane detection is impossible; and determining an in-lane stop and the straight stop type as the MRM types possible to be performed, when the lane detection is possible.

According to the embodiment, the method may further include: comparing a size of the shoulder of a road with a size of the vehicle when there is the shoulder of a road within the designated range; determining a half-shoulder stop type, the in-lane stop type and the straight stop type as the MRM types possible to be performed when a size of the shoulder of a road is smaller than a size of the vehicle; and determining a full-shoulder stop type, the half-shoulder stop type, the in-lane stop type and the straight stop type as the MRM types possible to be performed when a size of the shoulder of a road is smaller than a size of the vehicle.

According to the embodiment, the method may further include: storing information of at least one of the possibility of the lateral control, the presence of the shoulder of a road, the size of the shoulder of a road, or the possibility of lane detection in the memory.

According to various embodiments of the present disclosure, when a vehicle detects a situation in which normal autonomous driving is impossible during autonomous driving, the vehicle may improve safety by determining a minimum risk maneuver strategy based on vehicle state information, and/or surrounding environment information.

BRIEF DESCRIPTION OF THE DRAWINGS

FIG. 2 is a functional block diagram of a processor according to various embodiments of the present disclosure.

FIG. 3 is a view illustrating minimum risk maneuver (MRM) strategies for each vehicle state according to various embodiments of the present disclosure.

DETAILED DESCRIPTION

Figure 1:
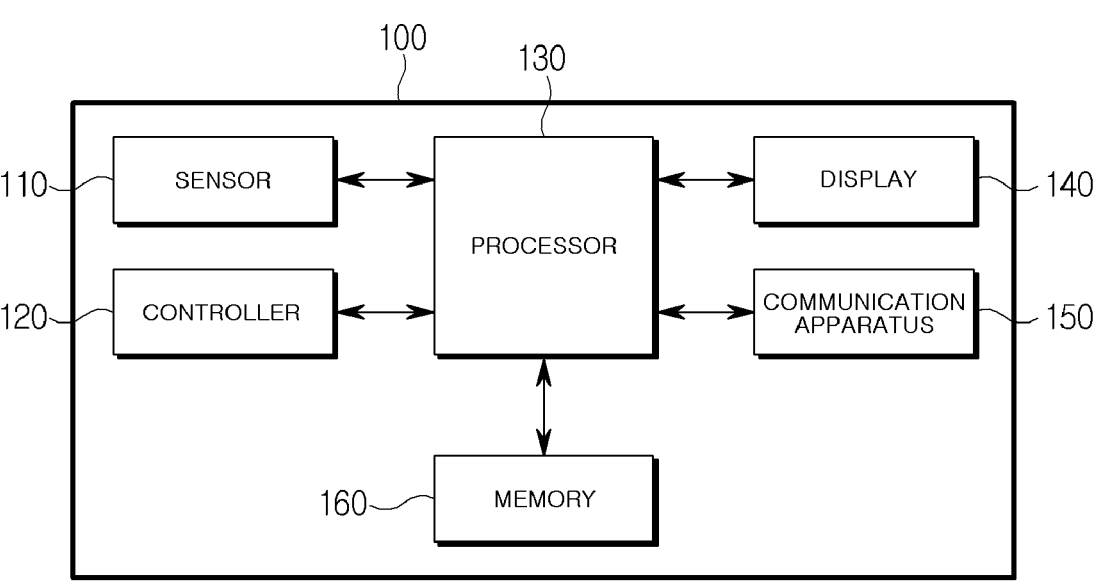
FIG. 1 is a block diagram of a vehicle according to various embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In certain aspects, a present vehicle may be an autonomous vehicle.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

Hereinafter, embodiments of the present disclosure will be described in further detail with reference to the accompanying drawings.

The configuration and advantages of the present disclosure will be more apparent from the following detailed description. Wherever possible, the same reference numerals will be used throughout the drawings to refer to the same elements even if shown in another drawing. It will be paid attention that detailed description of known arts will be omitted if it is determined that the arts can mislead the present disclosure.

Before describing the present disclosure in detail, terms being used in the present disclosure may be defined as below.

The vehicle is equipped with an Automated Driving System (ADS) and is a vehicle capable of autonomous driving. For example, by the ADS, the vehicle may perform at least one of steering, acceleration, deceleration, lane change, or stopping (or short stop) without a driver's manipulation. For example, the ADS may include at least one of Pedestrian Detection and Collision Mitigation System (PDCMS), Lane Change Decision Aid System (LC-DAS), Land Departure Warning System (LDWS), Adaptive Cruise Control (ACC), Lane Keeping Assistance System (LKAS), Road Boundary Departure Prevention System (RBDPS), Curve Speed Warning System (CSWS), Forward Vehicle Collision Warning System (FVCWS), or Low Speed Following (LSF).

A driver is a human being who uses a vehicle, and is a human being provided with a service of an autonomous driving system.

A vehicle control authority is an authority for controlling at least one component of the vehicle and/or at least one function of the vehicle. At least one function of the vehicle may include, for example, at least one of steering, acceleration, deceleration (or braking), lane change, lane detection, lateral control, obstacle recognition and distance detection, powertrain control, safe area detection, engine on/off, power on/off, or vehicle lock/unlock. The listed functions of the vehicle are merely examples for helping understanding, and embodiments of the present disclosure are not limited thereto.

A shoulder may mean a space between an outermost road boundary (or a boundary of an outermost lane) in a direction in which a vehicle is traveling and a road edge (e.g., curb, guardrail).

Figure 4A:
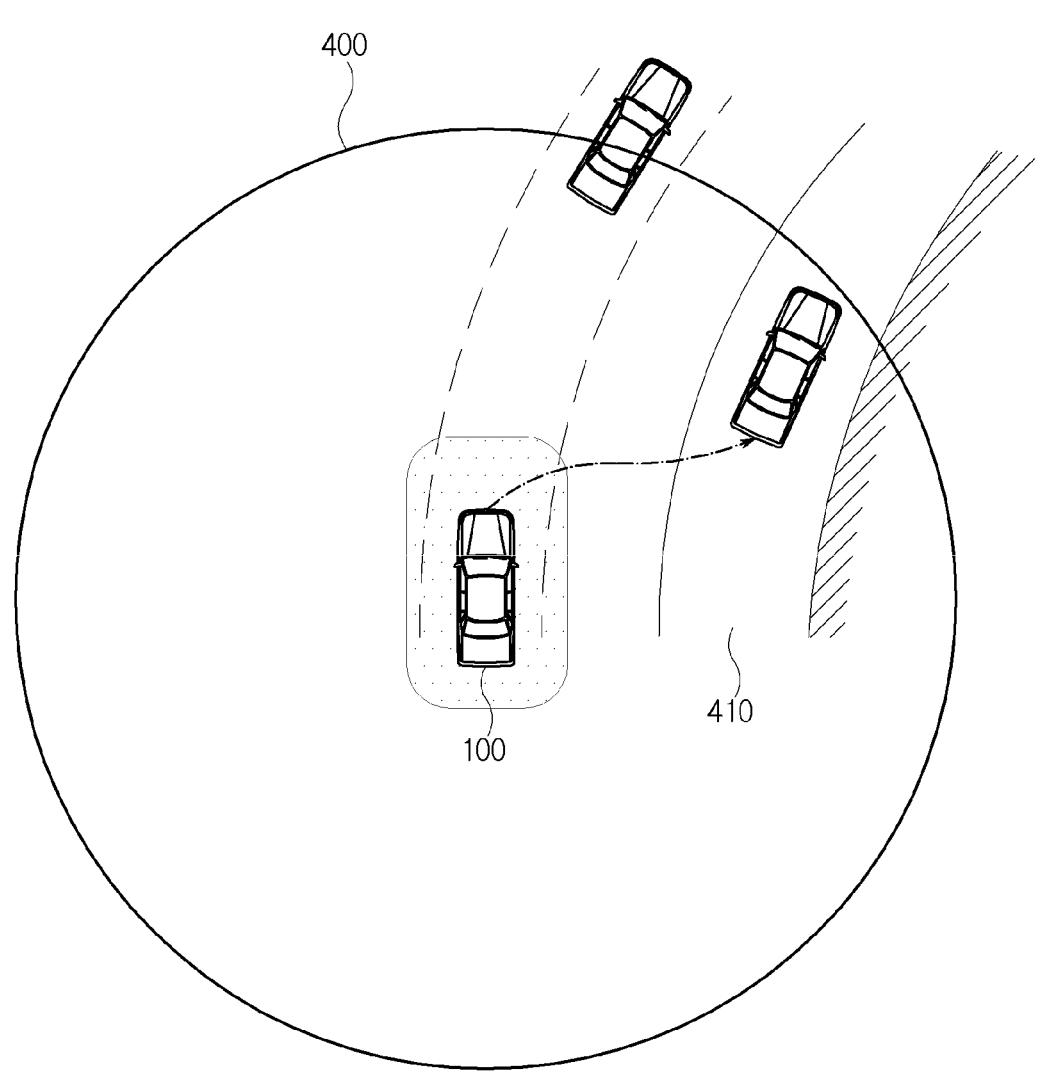
FIGS. 4A and 4B are example illustrations of determining an MRM strategy based on surrounding environment information within a designated MRC range of the vehicle according to various embodiments of the present disclosure.
Figure 4B:
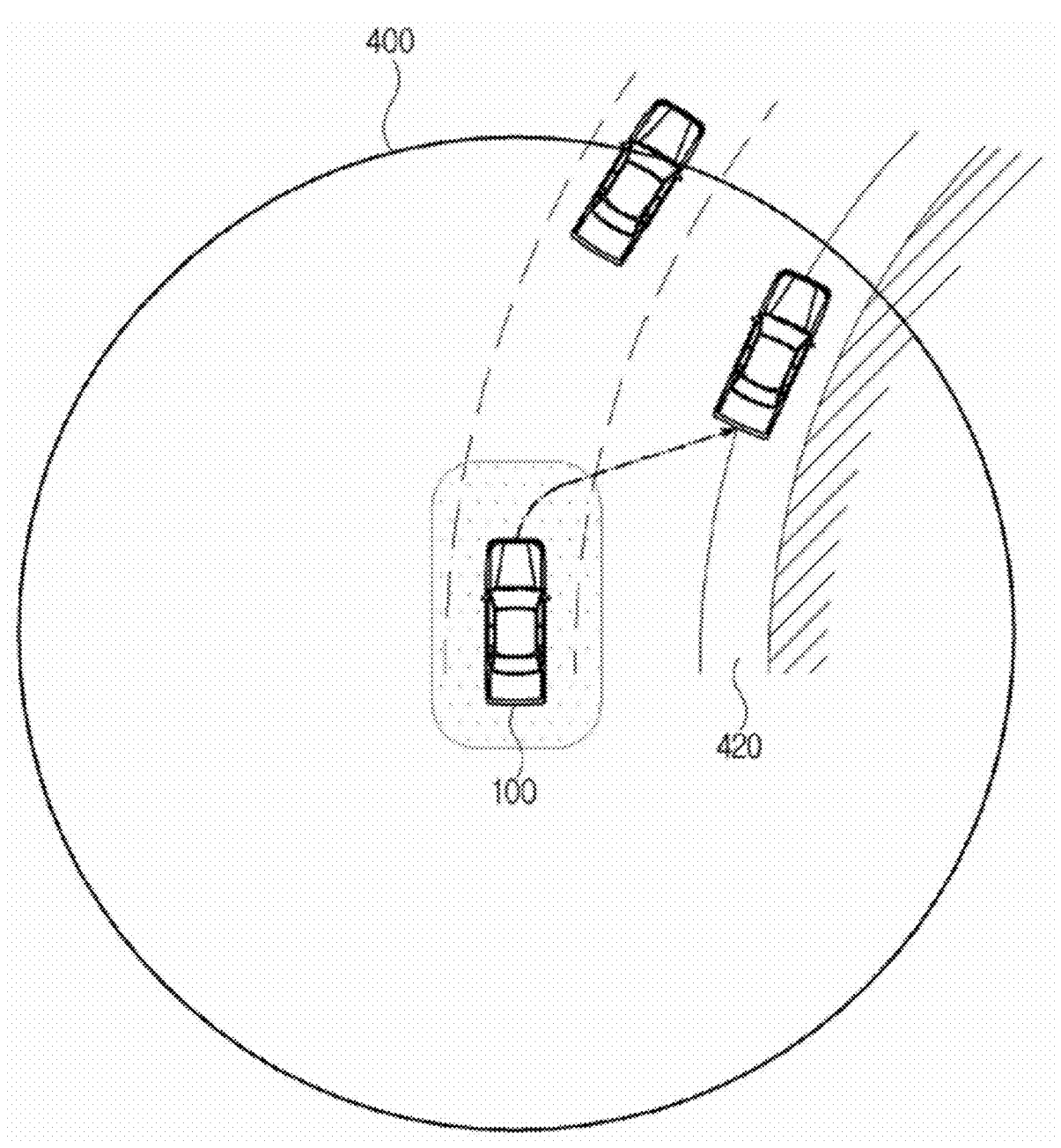
Figure 5:
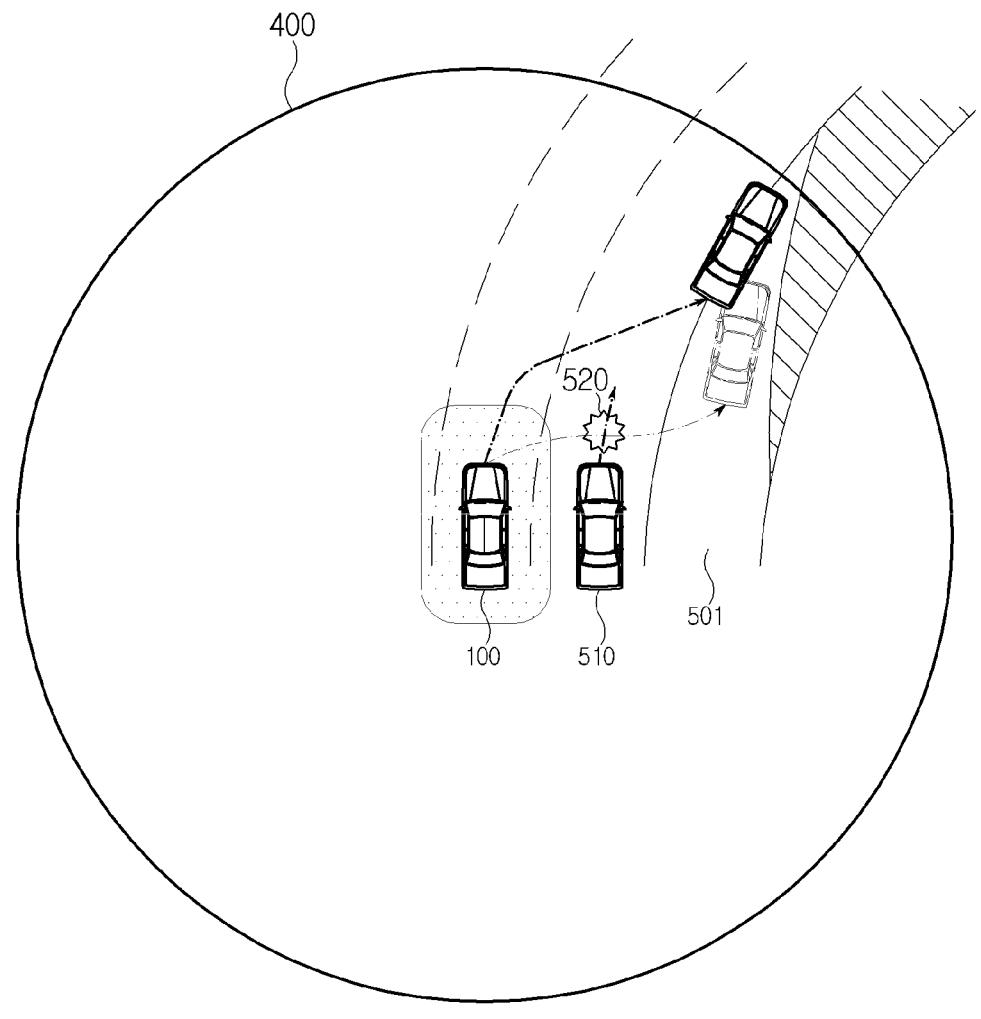
FIG. 5 is an example illustration in which a priority of the MRM strategy is changed according to surrounding object information within a designated MRC range of the vehicle according to various embodiments of the present disclosure.
Figure 6A:
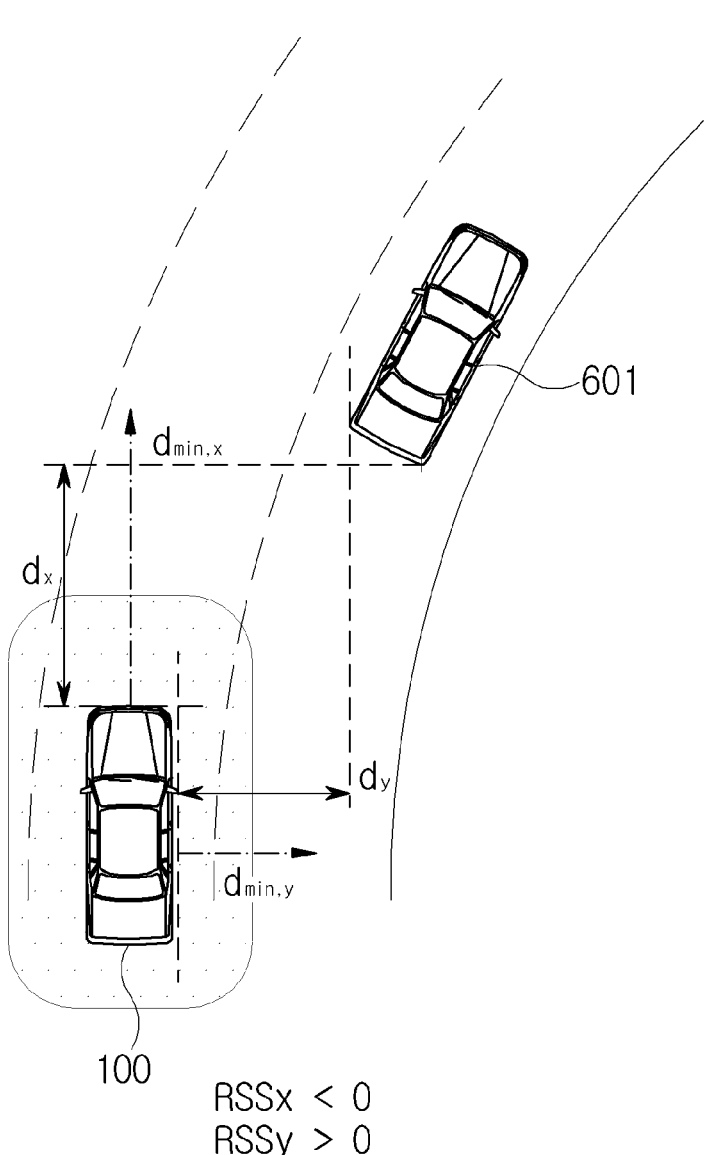
FIGS. 6A to 6C are example illustrations of determining whether a vehicle collides with a neighboring vehicle due to an MRM of the vehicle according to various embodiments of the present disclosure.
Figure 6B:
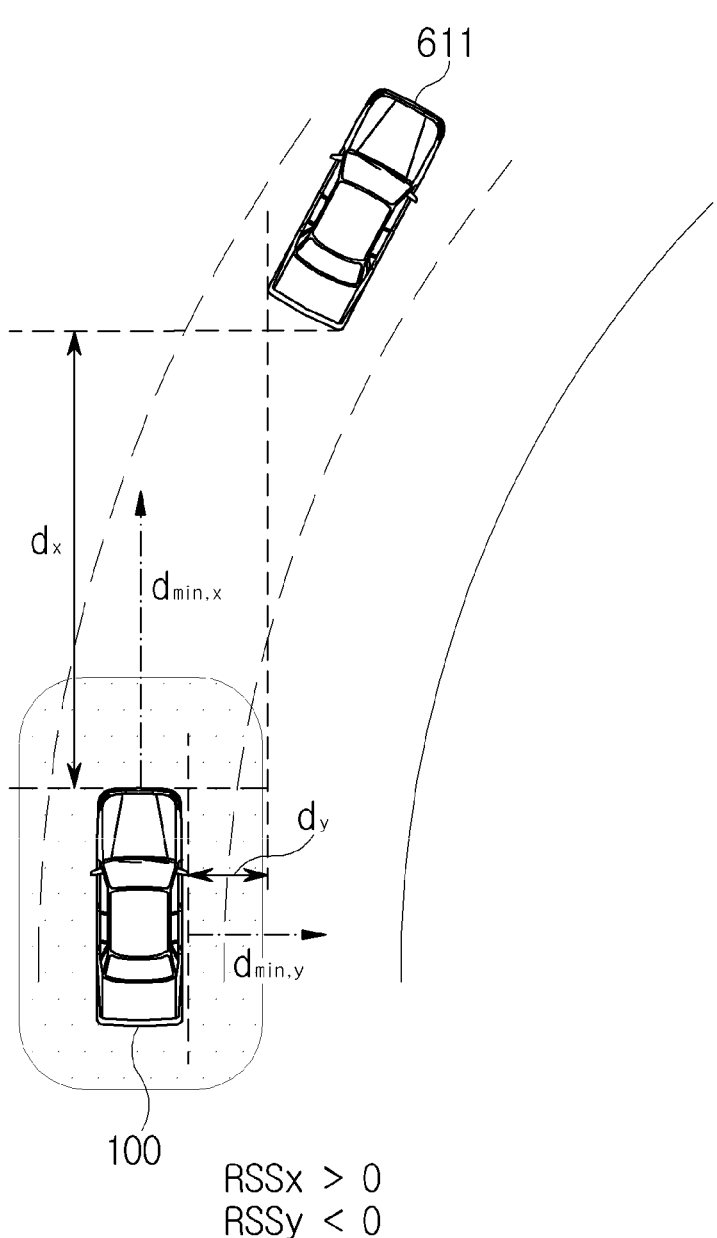
Figure 6C:
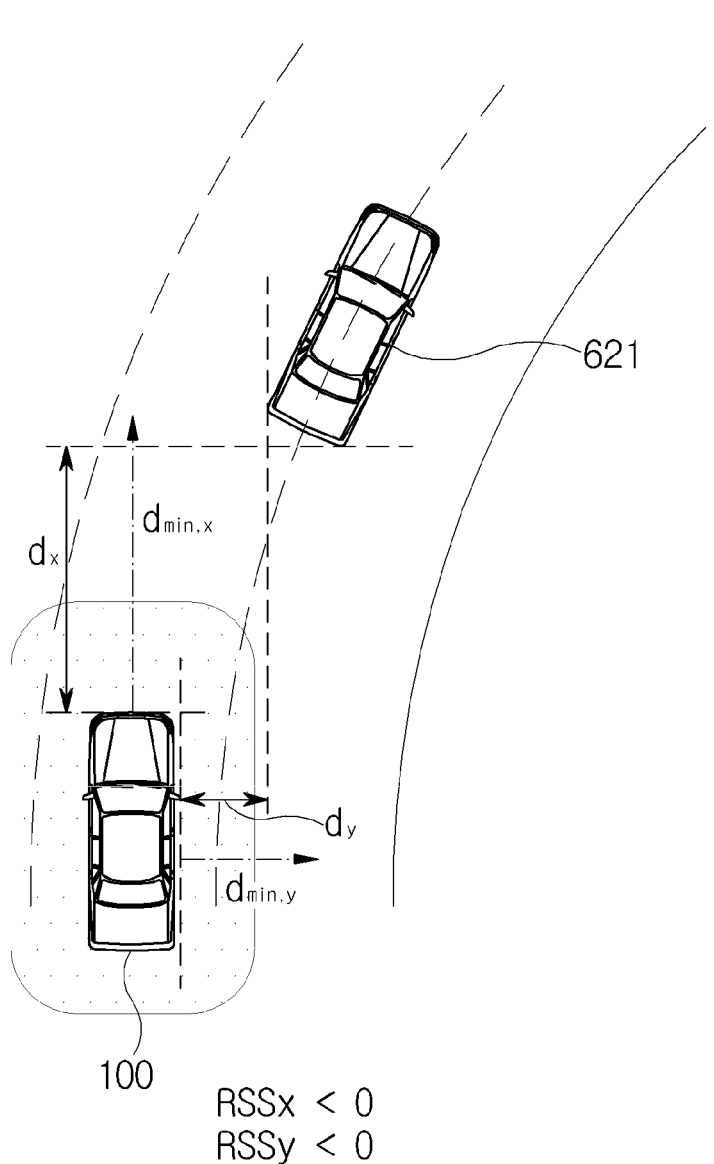
Figure 7:
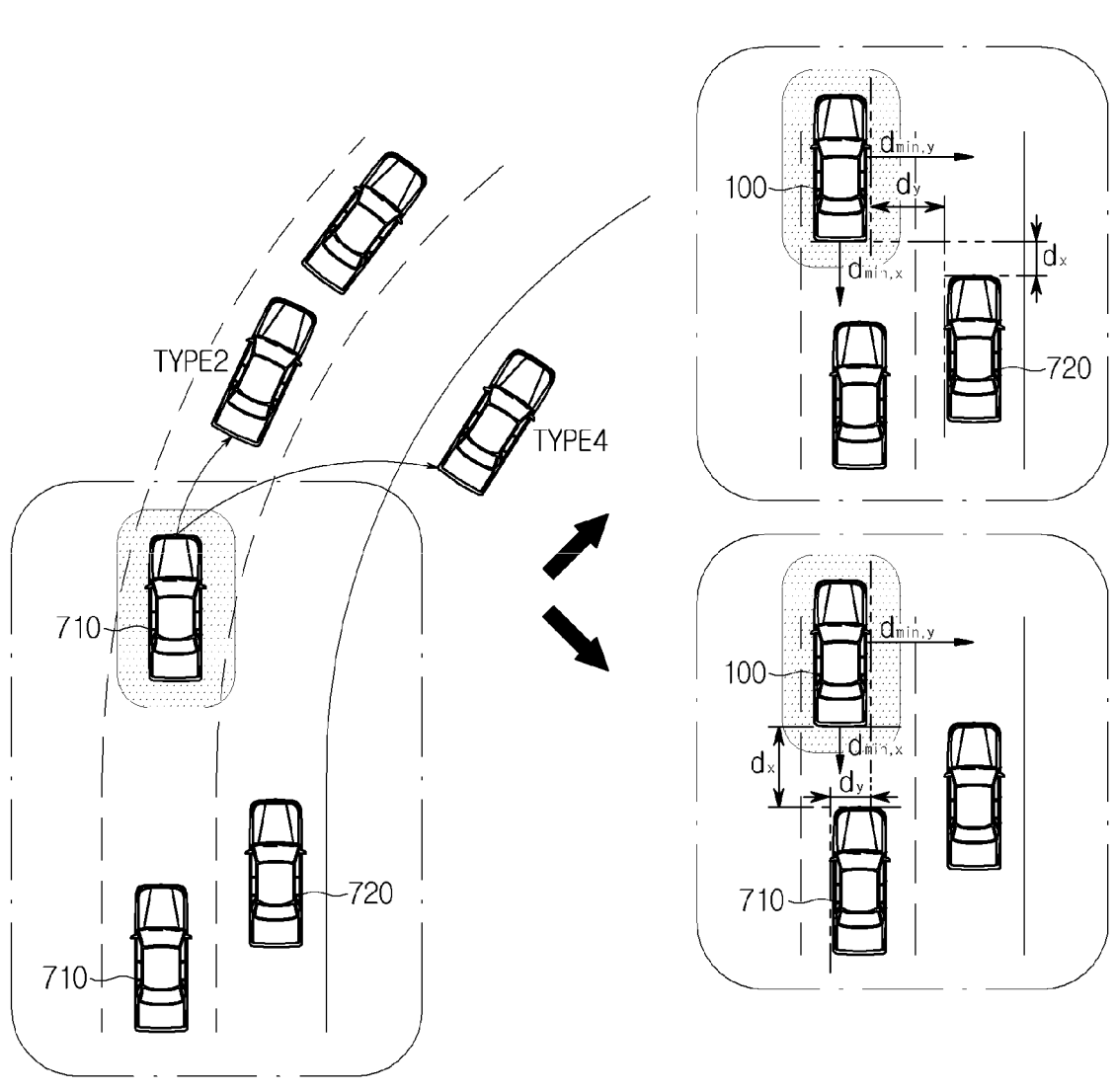
FIG. 7 is an example illustration of determining an MRM strategy of a vehicle considering whether the vehicle collides with a neighboring vehicle due to a determined MRM of the vehicle according to various embodiments of the present disclosure.
Figure 8A:
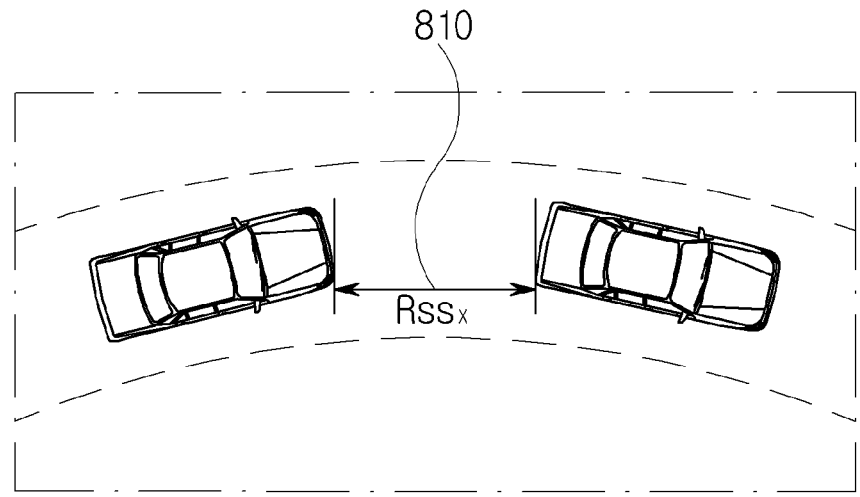
FIGS. 8A and 8B are example illustrations for calculating a distance from a vehicle according to various embodiments of the present disclosure to a neighboring vehicle.
Figure 8B:
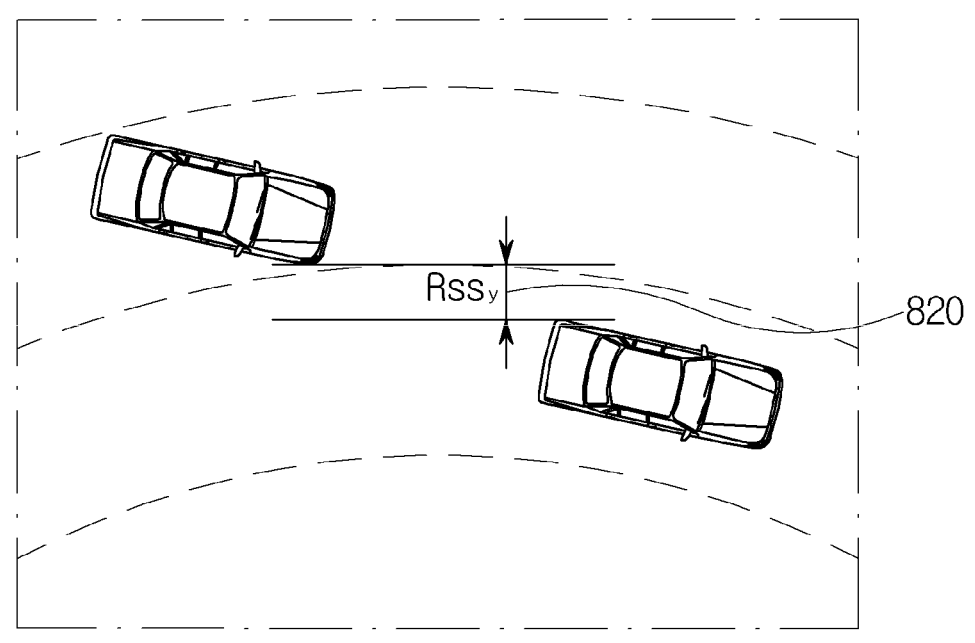

FIG. 1 is a block diagram of a vehicle according to various embodiments of the present disclosure. The configuration of the vehicle illustrated in FIG. 1 is one embodiment, and each component may be configured as one chip, one component, or one electronic circuit, or a combination of chips, components and/or electronic circuits. According to the embodiment, some of the components illustrated in FIG. 1 may be divided into a plurality of components and configured as different chips, different components, or different electronic circuits, and some components may be combined to form one chip, one component, or one electronic circuit. According to the embodiment, some of the components illustrated in FIG. 1 may be omitted or other components not illustrated may be added. At least some of the components of FIG. 1 will be described with reference to FIGS. 2 to 8. FIG. 2 is a functional block diagram of the processor according to various embodiments of the present disclosure, and FIG. 3 is a view illustrating minimum risk maneuver (MRM) strategies for each vehicle state according to various embodiments of the present disclosure. FIGS. 4A and 4B are example illustrations of determining an MRM strategy based on surrounding environment information within a designated MRC range of the vehicle according to various embodiments of the present disclosure, and FIG. 5 is an example illustration in which a priority of the MRM strategy is changed according to surrounding object information within a designated MRC range of the vehicle according to various embodiments of the present disclosure. FIGS. 6A to 6C are example illustrations of determining whether a vehicle collides with a neighboring vehicle due to an MRM of the vehicle according to various embodiments of the present disclosure, and FIG. 7 is an example illustration of determining an MRM strategy of a vehicle considering whether the vehicle collides with a neighboring vehicle due to a determined MRM of the vehicle according to various embodiments of the present disclosure. FIGS. 8A and 8B are example illustrations for calculating a distance from a vehicle according to various embodiments of the present disclosure to a neighboring vehicle.

Referring to FIG. 1, the vehicle 100 may include a sensor 110, a controller 120, a processor 130, a display 140, a communication apparatus 150, and a storage device 160.

According to various embodiments, the sensor 110 may sense an environment around the vehicle 100 and generate data related to the surrounding environment of the vehicle 100. According to the embodiment, the sensor 110 may obtain road information, information on objects around the vehicle (e.g., other vehicles, people, objects, curbs, guardrails, lanes, obstacles) and/or location information of the vehicle based on the sensing data obtained from at least one sensor. The road information may include, for example, at least one of lane location, a shape of a lane, a color of a lane, a type of lane, the number of lanes, whether a shoulder exists, or a size of a shoulder. The object around the vehicle may include, for example, at least one of a position of the object, a size of the object, a shape of the object, a distance to the object, or a relative speed to the object.

According to the embodiment, the sensor 110 may include at least one selected of a camera, a light detection and ranging (LIDAR) sensor, a radio detection and ranging (RADAR) sensor, an ultrasonic sensor, an infrared sensor, or a location measurement sensor. The listed sensors are merely examples for helping understanding, and the sensors included in the sensor 110 of the present disclosure are not limited thereto. The camera may photograph the surroundings of the vehicle 100 to generate image data that includes a lane and/or neighboring object positioned in front, on a rear side, and/or on a side of the vehicle 100. The LIDAR may generate information on an object located in front, on a rear side, and/or on a side of the vehicle 100 using light (or a laser). The radar may generate information on an object located in front, on a rear side and/or on a side of the vehicle 100 using electromagnetic waves (or radio waves). The ultrasonic sensor may generate information on an object located in front, on a rear side and/or on a side of the vehicle 100 using ultrasonic waves. The infrared sensor may generate information on an object located in front, on a rear side and/or on a side of the vehicle 100 using infrared rays. The location measurement sensor may measure the current location of the vehicle 100. The location measurement sensor may include at least one of a Global Positioning System (GPS) sensor, a Differential Global Positioning System (DGPS) sensor or a Global Navigation Satellite System (GNSS) sensor. The location measurement sensor may generate location data of the vehicle based on a signal generated by at least one of a GPS sensor, DGPS sensor or GNSS sensor.

According to various embodiments, the controller 120 may control operation of at least one component of the vehicle 100 and/or at least one function of the vehicle according to the control of the processor 130. The at least one function may be, for example, at least one of a steering function, an acceleration function (or a longitudinal acceleration function), a deceleration function (or a longitudinal deceleration function, a brake function), a lane change function, a lane detection function, an obstacle recognition and a distance detection function, a lateral control function, a powertrain control function, a safety zone detection function, an engine on/off, a power on/off, or a vehicle lock/unlock function.

According to the embodiment, the controller 120 may control at least one component of the vehicle and/or at least one function of the vehicle for autonomous driving and/or a minimal risk maneuver (MRM) of the vehicle 100 according to the control of the processor 130. For example, for the MRM, the controller 120 may control the operation of at least one function of a steering function, an acceleration function, a deceleration function, a lane change function, a lane detection function, a lateral control function, an obstacle recognition and distance detection function, a powertrain control function, or a safe zone detection function.

According to various embodiments, the processor 130 may control the overall operation of the vehicle 100. According to the embodiment, the processor 130 may include an electrical control unit (ECU) capable of integrally controlling components in the vehicle 100. For example, the processor 130 may include a central processing unit (CPU) or micro processing unit (MCU) capable of performing arithmetic processing.

According to various embodiments, when a specified event is generated, the processor 130 may activate the Automated Driving System (ADS) to control components in the vehicle 100 such that the vehicle performs autonomous driving. The specified event may be generated when autonomous driving of the driver is requested, vehicle control authority from the driver is delegated, or a condition specified by the driver and/or designer is satisfied.

According to various embodiments, the processor 130 may determine whether normal autonomous driving is possible based on at least one of vehicle state information or surrounding environment information during autonomous driving. When normal autonomous driving is impossible, the processor 130 may determine an MRM strategy and control the determined MRM strategy to be performed. Here, the MRM strategy may include MRM types.

According to the embodiment, the processor 130 may include a vehicle state information obtaining unit 210, a surrounding environment information obtaining unit 220, and an MRM strategy determination unit, as illustrated in FIG. 2.

From the time when ADS is activated, the vehicle state information obtaining unit 210 may obtain vehicle state information indicating whether mechanical and/or electrical faults of components inside the vehicle occur or not, by monitoring mechanical and/or electrical states of components inside the vehicle (e.g., sensors, actuators and the like). The vehicle state information may include information about mechanical states and/or electrical states of components inside the vehicle. For example, the vehicle state information may include information indicating whether functions necessary for autonomous driving can normally operate or not according to mechanical and/or electrical states of components inside the vehicle.

The surrounding environment information obtaining unit 220 may obtain environment information around the vehicle using the sensor 110 and/or the communication apparatus 150 from the time when the ADS is activated. The surrounding environment information obtaining unit 220 may include a road information obtaining unit 221 for obtaining information on a road on which the vehicle is traveling, and a neighboring object information obtaining unit 223 for detecting an object around the vehicle from the sensor 110.

According to the embodiment, the road information obtaining unit 221 may obtain road information of a location in which the vehicle is traveling through the sensor 110. According to the embodiment, the road information obtaining unit 221 may obtain map information from an external device (e.g., another vehicle or a server) through the communication apparatus 150, and obtain road information of a location in which the vehicle is traveling from the map information.

According to the embodiment, the neighboring object information obtaining unit 223 may obtain information on objects (e.g., other vehicles, people, objects, curbs, guard rails, lanes, obstacles) around the vehicle through the sensor 110. For example, the neighboring object information obtaining unit 223 may obtain a distance to at least one vehicle located in front, on a side, and/or on a rear side of the vehicle and a relative speed thereto.

According to the embodiment, the processor 130 may determine whether functions necessary for autonomous driving are normally operable based on the vehicle state information. Functions required for autonomous driving may include, for example, at least one of a lane detection function, a lane change function, a lateral control function, a deceleration (or brake control) function, a powertrain control function, a safe area detection function, an obstacle recognition function, or a distance sensing function. When the normal operation of at least one of the functions required for autonomous driving is impossible, the processor 130 may determine that normal autonomous driving is impossible.

According to the embodiment, the processor 130 may determine whether the vehicle state is suitable for general driving conditions based on the vehicle state information. For example, the processor 130 may determine whether the vehicle's mechanical state information (e.g., tire pressure information or engine overheat information) is suitable for general driving conditions. When the vehicle state is not suitable for general driving conditions, the processor 130 may determine that normal autonomous driving is impossible. For example, when the vehicle cannot be driven due to tire air pressure or engine overheating, the processor 130 may determine that normal autonomous driving is impossible.

According to the embodiment, the processor 130 may determine whether an environment around the vehicle is suitable for an operation design domain (ODD) of autonomous driving based on at least one of the surrounding environment information. The operation design domain may represent a condition for the surrounding environment in which autonomous driving normally operates. The processor 130 may determine that normal autonomous driving is impossible when the surrounding environment information of the vehicle does not match the operation design domain.

According to various embodiments, when the normal autonomous driving is impossible, the processor 130 may determine it as a situation in which the MRM to minimize the risk of an accident is required. The processor 130 may select one strategy among a plurality of the MRM strategies by using the MRM strategy determination unit 240 in a situation in which it is necessary to perform the MRM. The MRM strategies may include four types, as illustrated in FIG. 3. For example, the MRM strategies may include a Traffic Lane Stop 301 strategy including Type 1 and Type 2, and a Road Shoulder Stop 303 strategy including Type 3 and Type 4.

The Traffic Lane Stop 301 strategy may include a straight stop 311 of Type 1, and an in-lane stop 312 of Type 2. The Road Shoulder Stop 303 strategy may include a half-shoulder stop 313 of Type 3, and a full-shoulder stop 314 of Type 4.

The straight stop 311 of Type 1 is a type that stops the vehicle using only the brake control 323, which is a deceleration function in a longitudinal direction, and is not accompanied with the lateral control. For example, the straight stop 311 may be performed in a situation where at least one function of the lateral control 321, the powertrain control 322, the lane change 324, or the detection of potential stopping location out of the traffic lane 325 is impossible. For example, the straight stop may be performed in a situation in which lane detection is impossible and lateral control is impossible due to a defect in the actuator. Here, the detection of potential stopping location out of the traffic lane may refer to a function of detecting a potential stopping location out of a traffic lane, such as a shoulder or a drowsiness shelter.

The in-lane stop 312 of Type 2 is a type in which the vehicle stops within a boundary of the lane in which it is traveling. For example, the in-lane stop 312 may mean a type in which the vehicle stops within a boundary of a lane in which the vehicle is traveling through the lateral control 321 and/or the brake control 323. The driving lane may mean a lane in which the vehicle is traveling at a time when it is determined that the MRM is required. The in-lane stop 312 may be performed in a situation in which at least one function of the powertrain control 322, the lane change 324, or the detection of potential stopping location out of the traffic lane 325 is impossible to operate.

The half-shoulder stop 313 of Type 3 is a type to stop a vehicle while a portion of the vehicle is located on a shoulder of a road. For example, the half-shoulder stop 313 may indicate a type to stop a vehicle while a portion of the vehicle is located on a shoulder after moving to be out of a road boundary (or boundary of the outermost lane) through the lateral control 321, brake control 323, lane change 324, and/or detection of potential stopping location out of the traffic lane 325.

The full-shoulder stop 314 of Type 4 is a type to stop a vehicle while the entire vehicle is located on the shoulder of the road. For example, the full shoulder stop 314 may indicate a type to stop a vehicle after the vehicle as a whole crosses the road boundary and moves out to be located on the shoulder through the lateral control 321, brake control 323, lane change 324, and/or detection of potential stopping location out of the traffic lane 325.

According to the embodiment, a priority of the above-described MRM types may be determined based on the road, the surrounding environment, and the failure-operational capability of the vehicle. For example, in order to minimize the risk at the time of vehicle stopping, a priority of MRM types corresponding to the road shoulder stop strategy 303 may be set higher than the MRM types corresponding to the traffic lane stop strategy 301. In addition, a priority of the full-shoulder stop 314 may be set higher than that of the half-shoulder stop 313, and a priority of the in-lane stop 312 may be set higher than that of the straight stop 311. That is, the priority of MRM types may be set to be lowered in the order of the full-shoulder stop 314, half-shoulder stop 313, in-lane stop 312, and straight stop 311.

According to various embodiments, the MRM strategy determination unit 240 of the processor 130 may select an MRM strategy based on at least one of the vehicle state information or surrounding environment information.

According to the embodiment, the MRM strategy determination unit 240 may check an MRM type that can be performed among the above-described MRM types based on a function that normally operates and/or a function that cannot operate normally among functions required for autonomous driving based on vehicle status information. For example, when the lateral control function operates normally, it may be determined that all of the MRM types which are the straight stop 311, in-lane stop 312, half-shoulder stop 313, and full-shoulder stop 314 can be performed. As another example, when the lateral control function does not operate normally, the straight stop 311 may be determined as the MRM type that can be performed.

If there is one MRM type that can be performed based on vehicle state information, the MRM strategy determination unit 240 may determine the corresponding MRM type as the MRM strategy. For example, the MRM strategy determination unit 240 can only perform the straight stop 311 in a situation where the lateral control function does not operate normally, thus the straight stop 311 may be determined as the MRM strategy. As another example, when a driving lane is not detected due to a sensor defect and/or an external environment, the MRM strategy determination unit 240 may perform the straight stop 311 only, and accordingly, the straight stop 311 can be determined as the MRM strategy.

When there are a plurality of MRM types that can be performed based on the vehicle state information, the MRM strategy determination unit 240 may determine an MRM type that can be performed within a designated minimum risk condition (MRC) range. According to the embodiment, the designated MRC range may be set and/or changed by operators and/or designers. According to the embodiment, the designated MRC range may be set differently depending on vehicle performance, vehicle type, and/or external environmental factors (e.g., weather, time, etc.).

According to the embodiment, the MRM strategy determination unit 240 may determine an MRM type that can be performed within the MRC range based on whether a shoulder exists within the designated MRC range. When the shoulder does not exist within the designated MRC range, the MRM strategy determination unit 240 may determine the in-lane stop 312 and straight stop 311 as the MRM type that can be performed within the MRC range.

When the shoulder exists within the designated MRC range, the MRM strategy determination unit 240 may determine the MRM type that can be performed within the MRC range based on a size of the shoulder. If the size of the shoulder within the designated MRC range is greater than or equal to the designated size, the MRM strategy determination unit 240 may determine the full-shoulder stop 314, half-shoulder stop 313, in-lane stop 312, and straight stop 311 as the MRM types that can be performed within the MRC range. The designated size may be determined based on a size of the vehicle. When the size of the shoulder is smaller than the designated size, the MRM strategy determination unit 240 may determine the half-shoulder stop 313, in-lane stop 312, and straight stop 311 as the MRM types that can be performed within the MRC range.

According to various embodiments, the MRM strategy determination unit 240 may select a final MRM strategy in consideration of the priority and/or neighboring object information when there are a plurality of MRM types that can be performed within the designated MRC range.

According to the embodiment, when there are a plurality of MRM types that can be performed within the designated MRC range, the MRM strategy determination unit 240 may determine the MRM type having the highest priority as the final MRM strategy among the MRM types that can be performed within the designated MRC range. For example, as illustrated in FIG. 4A, when a width of the shoulder 410 within the designated MRC range 400 is greater than a width of the vehicle 100, the MRM strategy determination unit 240 may determine the full-shoulder stop 314 having the highest priority as the final MRM strategy among the MRM types that can be performed within the MRC range 400. As another example, as illustrated in FIG. 4B, when a width of the shoulder 420 within the designated MRC range 400 is smaller than a width of the vehicle 100, the MRM strategy determination unit 240 may determine the half-shoulder stop 313 having the highest priority as the final MRM strategy among the MRM types that can be performed within the designated MRC range 400.

According to the embodiment, the MRM strategy determination unit 240 may determine the final MRM strategy by additionally taking into consideration a risk associated with performing the MRM strategy within the designated MRC range. For example, as illustrated in FIG. 5, a case is assumed, in which the shoulder 501 exists within the MRC range 400, but a width of an area adjacent to the vehicle 100 among the areas of the shoulder 501 within the MRC range 400 is larger than a width of the vehicle 100 and a width of the area located far from the vehicle 100 is smaller than a width of the vehicle 100. That is, a case in which the shoulder 501 having a gradually decreasing width exists within the MRC range 400 is assumed for description. In this case, the MRM strategy determination unit 240 may select the full-shoulder stop 314 having the highest priority based on the width of the shoulder 501. However, at the time of performing the full-shoulder stop 314, if there is a risk of a collision 520 with another vehicle 510, the MRM strategy determination unit 240 may select the half-shoulder stop 313 having a lower priority than the full-shoulder stop 314 as the final MRM strategy, since the half-shoulder stop 313 does not have a risk of colliding with another vehicle 510.

According to the embodiment, if there are a plurality of MRM types that can be performed within the designated MRC range, the MRM strategy determination unit 240 may select the final MRM strategy in consideration of a possibility of a collision and/or whether there is a liability for an accident. For example, the MRM strategy determination unit 240 may select the MRM type having a low possibility of colliding with a neighboring vehicle as the final MRM strategy among the plurality of MRM types that can be performed within the designated MRC range. In addition, the MRM strategy determination unit 240 may select the MRM type having a lower possibility to have a liability for an accident for the collision as the MRM strategy when all of the plurality of MRM types that can be performed within the designated MRC range are highly likely to collide with a neighboring vehicle. The MRM strategy determination unit 240 may determine the possibility of a collision with neighboring vehicles and/or whether there is liability for an accident in the event of a collision based on the driving path for each MRM type that can be performed within the designated MRC range. With respect to the full shoulder stop and/or half-shoulder stop type requiring a lane change, the MRM strategy determination unit 240 may determine the possibility of a collision and/or the liability for an accident with a vehicle located in front, a vehicle located on a side, and/or a vehicle located on a rear side among the neighboring vehicles.

With respect to the in-lane stop type that does not require a lane change, the MRM strategy determination unit 240 may determine the possibility of a collision and/or the liability for an accident with a vehicle located on a rear side among the neighboring vehicles.

In order to determine the possibility of a collision with neighboring vehicles and/or whether there is a liability for an accident, the MRM strategy determination unit 240 may calculate a safe distance representing a difference between a minimum relative distance and an actual relative distance to the neighboring vehicle based on Responsibility Sensitivity Safety (RSS) model as illustrated in Equations 1.1 and 1.2, and based on the calculated safe distance, it is possible to determine the possibility of a collision and whether there is liability for an accident or not.

$$RSSx = d_x - d_{min,x} \qquad \text{(Equation 1.1)}$$

$$RSSy = d_y - d_{min,y} \qquad \text{(Equation 1.2)}$$

Here, RSSx means the longitudinal safe distance, $d_{min,x}$ means the minimum longitudinal relative distance to be maintained to the neighboring vehicle, and $d_x$ means the actual longitudinal relative distance between the own vehicle and the neighboring vehicle. In addition, RSSy means the lateral safe distance, $d_{min,y}$ means the minimum lateral relative distance to be maintained to the neighboring vehicle, and $d_y$ means the actual lateral relative distance between the vehicle and the neighboring vehicle. Here, $d_{min,x}$ and/or $d_{min,y}$ may be set differently depending on whether the neighboring vehicle is a vehicle located in front or on a front-lateral side, or a vehicle located on a rear side or rear-lateral side with respect to the own vehicle. For example, the longitudinal safe distance and the lateral safe distance that must be maintained to neighboring vehicles located in front or on a front-lateral side from the own vehicle may be set greater than the longitudinal safe distance and lateral safe distance that must be maintained to neighboring vehicles located on a rear side or rear-lateral side with respect to the own vehicle. This is to reflect the fact that in order to prevent a collision, the vehicle 100 is obliged to maintain a safe distance to the vehicle located in front or on a front-lateral side from the own vehicle 100, but there is no obligation to maintain a safe distance to the vehicle located on a rear side or rear-lateral side of the vehicle 100.

The MRM strategy determination unit 240 may determine that the possibility of colliding with a neighboring vehicle is low (or unlikely to collide) even if MRM with a driving path related to the neighboring vehicle is performed when at least one of the longitudinal safe distance (RSSx) or the lateral safe distance (RSSy) to the neighboring vehicle is a positive number. In addition, since the MRM strategy determination unit 240 maintains at least one of the longitudinal safe distance or the lateral safe distance to the neighboring vehicle (especially, a vehicle in front or a front-lateral side) even if a collision with a neighboring vehicle occurs, the MRM strategy determination unit 240 may determine that the vehicle has no liability for the accident. For example, as illustrated in FIG. 6A, if the longitudinal safe distance (RSSx) from the vehicle 100 to a right-front vehicle 601 is a negative number, but the lateral safe distance (RSSy) is a positive number, it may be determined that the possibility of colliding with the right-front vehicle 601 is low even if the MRM requiring a lane change (e.g., the half shoulder stop, or the full shoulder stop) is performed. Also, even if the vehicle collides with the right-front vehicle 601, since the vehicle 100 maintained the lateral safe distance to the right-front vehicle 601, it may be determined that the vehicle 100 has no liability for the accident. As another example, as illustrated in FIG. 6B, if the lateral safe distance (RSSy) to a front vehicle 611 traveling in the same lane as the own vehicle 100 is a negative number, but the longitudinal safe distance (RSSx) is a positive number, it may be determined that the possibility of a collision with the front vehicle 611 is low even if the MRM requiring a lane change (e.g., the half shoulder stop, and/or the full shoulder stop) is performed. Also, even if the vehicle collides with the front vehicle 611, since the vehicle 100 maintains the longitudinal safe distance to the front vehicle 611, it may be determined that the vehicle 100 has no liability for the accident.

The MRM strategy determination unit 240 may determine that the possibility of colliding with a neighboring vehicle is high (or there is the possibility to collide) when both the longitudinal safe distance (RSSx) and the lateral safe distance (RSSy) to the neighboring vehicle are negative numbers and the MRM having a driving path related to the neighboring vehicle is performed. In addition, when the vehicle collides with the neighboring vehicle, the MRM strategy determination unit 240 may determine that the vehicle has the liability for the accident since the vehicle does not maintain the longitudinal safe distance and lateral safe distance to neighboring vehicles (especially the vehicle in front or a front-lateral side). For example, as illustrated in FIG. 6C, when the longitudinal safe distance (RSSx) and the lateral safe distance (RSSy) from the vehicle 100 to the right-front vehicle 621 are both negative numbers, it may be determined that the possibility to collide with the right-front vehicle 621 is high when the MRM requiring a lane change is performed (e.g., the half shoulder stop, and/or the full shoulder stop). In addition, since the MRM strategy determination unit 240 does not maintain the longitudinal and lateral safe distances to the right-front vehicle 621, the MRM strategy determination unit 240 may determine that the accident liability is in the own vehicle when a collision with the right-front vehicle 621 occurs.

The MRM strategy determination unit 240 may select, as the final MRM, the in-lane stop type having a lower priority than the full-shoulder stop and the half-shoulder stop when it is determined that the possibility of collision with a neighboring vehicle is high when the MRM requiring a lane change is performed. In this case, the MRM strategy determination unit 240 may calculate the longitudinal safe distance and lateral safe distance from the rear vehicle traveling in the same lane as the own vehicle. The MRM strategy determination unit 240 may determine that if at least one among the longitudinal safe distance and lateral safe distance to the rear vehicle is a positive number, the possibility of a collision with the rear vehicle is low even if the in-lane stop is performed, and even if the vehicle collides, the liability for the accident is not in the own vehicle, and thus, the MRM strategy determination unit 240 may select the in-lane stop as the final MRM. For example, as illustrated in FIG. 7, the own vehicle 100 may calculate the longitudinal safe distance and the lateral safe distance to the rear-lateral vehicle 720 to perform the full-shoulder stop of Type 4, which has the highest priority, in a situation requiring to perform the MRM. However, when both the longitudinal safe distance and the lateral safe distance to the rear-lateral vehicle 720 are negative numbers, there is a high possibility of colliding with the rear-lateral vehicle 720 due to a lane change required in performing the full shoulder stop, and in the event of a collision with the rear-lateral vehicle 720, the own vehicle may have the liability for the collision. Therefore, since both the longitudinal safe distance and lateral safe distance between the own vehicle 100 and the rear vehicle 710 are positive numbers, the own vehicle 100 may select the in-lane stop of Type 2, which has a lower priority than Type 4, as the final MRM strategy.

According to the embodiment, the longitudinal safe distance and lateral safe distance between the own vehicle and the neighboring vehicle may be calculated as in Equations 2 and 3 below.

The Equation 2 below is a formula for calculating the longitudinal safe distance (Rss$_x$) 810 between the own vehicle Cr and the neighboring vehicle Cf as illustrated in FIG. 8A, and the Equation 3 is a formula for calculating the lateral safe distance (Rss$_y$) 820 between the own vehicle Cr and the neighboring vehicle Cf, as illustrated in FIG. 8$b$.

$$Rss_x = v_{x,r}\rho + \frac{a_{max,accel}\rho^2}{2} + \frac{(v_{x,r} + \rho a_{max,accel})^2}{2a_{max,brake}} - \frac{v_{x,r}^2}{2a_{max,brake}} \qquad \text{(Equation 2)}$$

$$Rss_y = \mu + \left[\frac{2v_{y,r}\rho + a_{max,accel}^{lat}\rho^2}{2} + \frac{(v_{y,r} + \rho a_{max,accel}^{lat})^2}{2a_{min,brake}^{lat}} - \right. \qquad \text{(Equation 3)}$$
$$\left. \left(\frac{2v_{y,f}\rho - a_{max,accel}^{lat}\rho^2}{2} \pm \frac{(v_{y,f} - \rho a_{max,brake}^{lat})^2}{2a_{max,brake}}\right)\right]$$

Here, $\rho$ may mean the reaction time, $\mu$ may mean the lateral margin, $a_{min,brake}$ may mean the minimum deceleration of the own vehicle, $a_{max,accel}$ may mean the maximum acceleration of the neighboring vehicle, and $a_{max,brake}$ may mean the maximum deceleration of the neighboring vehicle.

To calculate the lateral safe distance and/or longitudinal safe distance, parameters of Equations 2 and 3 may be set as shown in Table 1 below.

TABLE 1

| Param | value |
| --- | --- |
| $\rho$ | 0.5(s) |
| $\mu$ | 0.4(m) |
| $a_{max, brake}$ | 6(m/s$^2$) |

TABLE 1-continued

| Param | value |
| --- | --- |
| $a_{min, brake}$ | 8(m/s$^2$) |
| $a_{max, accel}$ | 0(m/s$^2$) |
| $a_{min, brake}^{lat}$ | 4(m/s$^2$) |
| $a_{max, accel}^{lat}$ | 0(m/s$^2$) |

The parameter values of Table 1 are not limited thereto.

According to the embodiment, the MRM strategy determination unit 240 may store, in the memory 160, the base data for which the final MRM strategy is selected when the final MRM strategy is selected. The base data may include at least one among presence of a shoulder within a designated MRC range, a shoulder size (e.g., length and/or width), a safe distance to a neighboring vehicle, vehicle state information of the own vehicle, or lane detection information. The MRM strategy determination unit 240 may secure the base for the selection of the MRM strategy having a low priority by storing the base data for which the final MRM strategy is selected. For example, the MRM strategy determination unit 240 may store, in the memory 160, at least one among information indicating abnormal operation of the lateral control function, steering angle, steering speed, information indicating a defect in the lane detection sensor, or sensing values of the lane detection sensor when the straight stop of Type 1 is selected as the final MRM strategy. As another example, the MRM strategy determination unit 240 may store information on the longitudinal safe distance and lateral safe distance to at least one neighboring vehicle calculated in the MRM strategy selection process when the in-lane stop of Type 2 is selected as the final MRM strategy, even if there is a shoulder in the designated MRC range. According to various embodiments, the processor 130 may control to stop the vehicle according to the final MRM strategy, while controlling to notify other vehicles and/or drivers of information indicating that the MRM is underway. The control operation to stop the vehicle may include generating a driving trajectory for stopping the vehicle, and/or the lateral and/or longitudinal control that follow the generated driving trajectory. The processor 130 may control a display 140 to notify the driver that the vehicle is performing the MRM. As another example, the processor 130 may control the communication apparatus 150 to notify the other vehicle that the vehicle is performing the MRM. This is merely an example for helping understanding, and the method for notifying that the MRM is underway will not be limited thereto.

According to various embodiments, the processor 130 may perform control operation for stopping the vehicle according to the determined MRM type, and determine whether the MRC is satisfied. MRC may mean a stopped state in which the vehicle speed is 0. For example, the processor 130 may determine whether the vehicle 100 gets into a stopped state in which the speed of the vehicle 100 is 0 while performing at least one operation according to the determined final MRM type. When the vehicle 100 gets into a state where the speed is 0, the processor 130 may determine that the MRC is satisfied.

According to various embodiments, when the MRC is satisfied, the processor 130 may end the MRM operation and switch the autonomous driving system (ADS) to a standby mode or an off-state. According to the embodiment, the processor 130 may control the autonomous driving system (ADS) to be transferred to the driver (or user) after switching the autonomous driving system (ADS) to the standby mode or off-state.

According to various embodiments, the display 140 may visually display information related to the vehicle 100. For example, the display 140 may provide various information related to the state of the vehicle 100 to the driver of the vehicle 100 under the control of the processor 130. The various information related to the state of the vehicle may include at least one of information indicating whether various components included in the vehicle and/or at least one function of the vehicle are normally operated, and information indicating the driving state of the vehicle. The driving state of the vehicle may include, for example, at least one of a state in which the vehicle is autonomously driving, a state in which the MRM is underway, a state in which the MRM is completed, or a state in which autonomous driving is ended.

According to various embodiments, the communication apparatus 150 may communicate with an external device of the vehicle 100. According to embodiments, the communication apparatus 150 may receive data from the outside of the vehicle 100 or transmit data to the outside of the vehicle 100 under the control of the processor 130. For example, the communication apparatus 150 may perform communication using a wireless communication protocol or a wired communication protocol.

In FIG. 1 described above, the controller 120 and the processor 130 have been described as separate components, but according to various embodiments, the controller 120 and the processor 130 may be integrated into one component.

Figure 9:
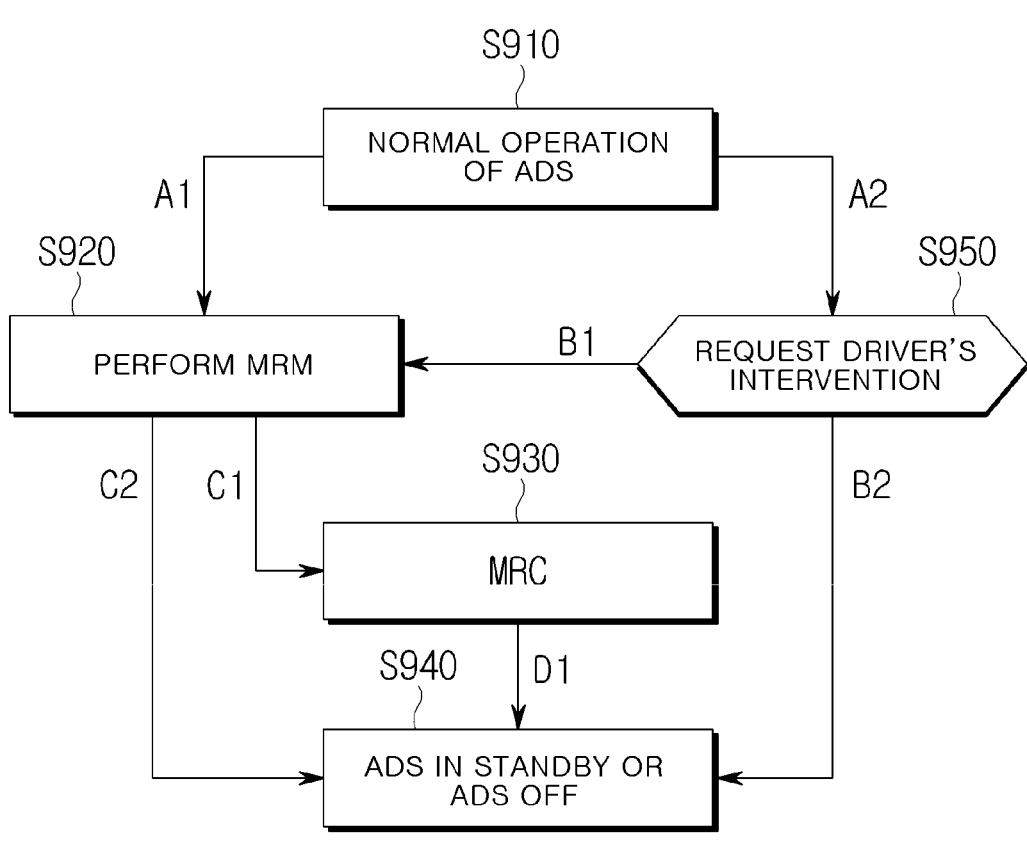
FIG. 9 is a flowchart illustrating an operation of a vehicle according to various embodiments of the present disclosure.

FIG. 9 is a flowchart illustrating an operation of a vehicle according to various embodiments of the present disclosure. A vehicle of FIG. 9 may be the vehicle 100 of FIG. 1.

Referring to FIG. 9, the vehicle 100 may normally operate the ADS in a step S910.

According to the embodiment, the vehicle 100 may monitor the vehicle state and the surrounding environment while performing the autonomous driving according to normal operation of the ADS. The vehicle 100 may detect whether the MRM is required based on information obtained by monitoring the vehicle state and the surrounding environment. If the MRM is required, an event A1 may be generated.

According to the embodiment, the vehicle 100 may detect whether the driver (or user) intervention is required while performing the autonomous driving according to the normal operation of the ADS. When driver intervention is required, the vehicle 100 may perform a Request To Intervene (RTI) through the ADS or issue a warning. The driver intervention request or warning may be an event A2. The vehicle 100 may proceed to a step S920 when the event A1 occurs in a state in which the ADS is normally operated.

When the event A2 occurs in a state in which the ADS operates normally, the vehicle 100 may determine whether the driver intervention is detected within a designated time in a step S950. The vehicle 100 may determine that an event B1 has occurred when no driver intervention is detected within the designated time. When the event B1 occurs, the vehicle 100 may proceed to a step S920. The vehicle 100 may determine that an event B2 has occurred when the driver intervention is detected within a designated time. When the event B2 occurs, the vehicle 100 may proceed to a step S940.

The vehicle 100 may perform the MRM in the step S920. According to the embodiment, the vehicle 100 may determine the MRM type based on at least one of the vehicle state information or the surrounding environment information. The surrounding environment information may include road information and information on neighboring vehicles. The MRM types, as illustrated in FIG. 3, may include the straight stop 311 of Type 1, the in-lane stop 312 of Type 2, the half-shoulder stop 313 of Type 3, and/or the full-shoulder stop 314 of Type 4. The vehicle 100 may control at least one component in the vehicle to stop the vehicle according to the determined MRM type. According to the embodiment, the vehicle 100 may store the base data used for determining the MRM type in the memory 160.

The vehicle 100 may determine whether the minimum risk requirement is satisfied as the speed of the vehicle becomes 0 by performing the MRM in the step S920. When the minimum risk requirement is satisfied, the vehicle 100 may determine that an event C1 has occurred and proceed to a step S930. The vehicle 100 may determine whether the driver's intervention is detected or not while the MRM is underway. When the driver's intervention is detected, the vehicle 100 may determine that an event C2 has occurred and proceed to the step S940.

In the step S930, the vehicle 100 may maintain a state in which the minimum risk requirement is satisfied. The state in which the minimum risk requirement is satisfied may mean a state in which the vehicle is stopped. For example, the vehicle 100 may maintain a stopped state. For example, the vehicle 100 may perform control operation for maintaining the vehicle in a stopped state regardless of an inclination of a road surface at the stopped location. The vehicle 100 may determine whether an event D1 occurs while maintaining a state in which the minimum risk requirement is satisfied. An event D1 may include at least one of ADS being turned off the by the driver, or completion to transfer the vehicle control authority to the driver. When the event D1 occurs, the vehicle 100 may proceed to the step S940.

The vehicle 100 may switch the ADS into a standby mode or an off-state in the step S940. The vehicle 100 does not perform operation for the autonomous driving while the ADS is in a standby mode or an off-state.

The steps S910, S920, S930, and S950 described above may be in a state in which the ADS is activated, and the step S940 may be in a state in which the ADS is inactive.

Figure 10:
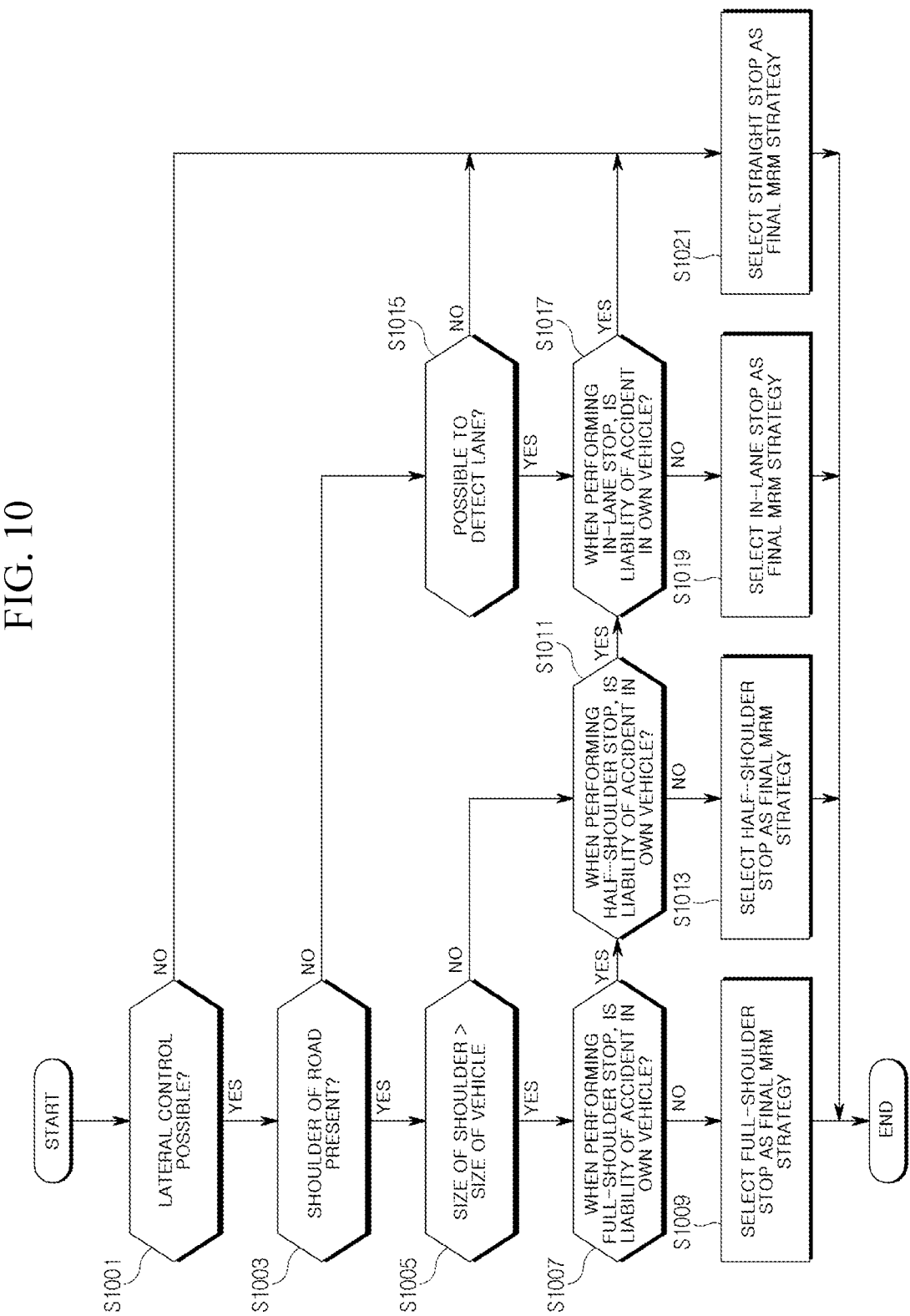
FIG. 10 is a flowchart of determining an MRM strategy by a vehicle according to various embodiments of the present disclosure.

FIG. 10 is a flowchart of determining an MRM strategy by a vehicle according to various embodiments of the present disclosure. The operations of FIG. 10 may be detailed operations of the step S920 of FIG. 9. In the following embodiment, each operation may be sequentially performed, but is not necessarily performed sequentially. For example, the order of each operation may be changed, and at least two operations may be performed in parallel. In addition, the following operations may be performed by the processor 130 and/or the controller 120 provided in the vehicle 100 or implemented as instructions executable by the processor 130 and/or the controller 120.

Referring to FIG. 10, the vehicle 100 may determine whether the lateral control is possible based on vehicle state information in a step S1001. For example, the vehicle 100 may obtain the vehicle state information indicating whether or not a mechanical failure and/or an electrical failure of the components inside the vehicle occurs by monitoring a mechanical state and/or an electrical state of components (e.g., the sensor, the actuator, etc.) inside the vehicle. The vehicle 100 may determine whether the lateral control (or steering control) of the vehicle 100 is possible based on the vehicle state information indicating a mechanical state and/or electrical state of the sensor and/or actuator.

If the lateral control is impossible, the vehicle 100 may select the straight stop as the final MRM strategy in a step S1021. For example, as illustrated in FIG. 3, since the vehicle 100 incapable of the lateral control may only perform the straight stop, the vehicle 100 may determine the straight stop as the final MRM strategy.

If the lateral control is possible, the vehicle 100 may determine whether a shoulder of a road exists within the MRC range in a step S1003. For example, the vehicle 100 may determine whether a shoulder exists by checking road information within an MRC range corresponding to being within a designated distance with respect to the own vehicle 100. The road information within the MRC range may be obtained from sensing data of sensors (e.g., the sensor 110) provided in the vehicle 100, or from map information obtained through the communication apparatus 150.

When there is no shoulder, the vehicle 100 may determine whether lane detection is possible in a step S1015. For example, since the vehicle 100 cannot perform the road shoulder stop strategy in a situation where a shoulder of a road does not exist, the vehicle 100 may check whether lane detection is possible in order to determine whether the in-lane stop is possible or not. The vehicle 100 may determine whether lane detection is possible or whether lane detection is impossible, based on the sensing value of the lane detection sensor.

When lane detection is impossible, the vehicle 100 may select the straight stop as the final MRM strategy in the step S1021. For example, when it is impossible to detect a lane, the vehicle 100 may determine that the in-lane stop cannot be performed, and may determine the straight stop as the final MRM strategy.

If the lane detection is possible, the vehicle 100 may determine whether liability for an accident is in the own vehicle during deployment (or fulfillment) of the in-lane stop in a step 1017. For example, the vehicle 100 may calculate a safe distance to the rear vehicle, and determine the possibility of a collision with the rear vehicle and whether or not to be liable for an accident based on the calculated safe distance. The rear vehicle may mean a vehicle traveling in the same lane as the own vehicle. The safe distance to the vehicle behind may include the longitudinal safe distance and the lateral safe distance as illustrated in Equations 1.1 and 1.2. If the calculated longitudinal safe distance and the lateral safe distance are both negative numbers, the vehicle 100 is highly likely to collide with a rear vehicle while performing the in-lane stop, and when a collision with the rear vehicle occurs, it may be determined that the liability for the accident is in the own vehicle. When at least one of the calculated longitudinal safe distance or the lateral safe distance is a positive number, the vehicle 100 is unlikely to collide with a rear vehicle when the in-lane stop is performed, and when a collision with the rear vehicle occurs, it may be determined that no liability for the accident is in the own vehicle.

When it is determined that the liability for the accident is in the own vehicle during fulfillment of the in-lane stop, the vehicle 100 may proceed to the step S1021 and select the straight stop as the final MRM strategy.

When it is determined that liability for the accident is not in the own vehicle during fulfillment of the in-lane stop, the vehicle 100 may select the in-lane stop as the final MRM strategy in a step S1019.

If a road shoulder exists as a result of check in the step S1003, the vehicle 100 may determine whether a size of the shoulder is greater than a size of the vehicle in a step S1005. For example, the vehicle 100 may compare a width of the shoulder to a width of the vehicle to determine whether the vehicle can perform the full-shoulder stop or the half-shoulder stop.

When the size of the shoulder is greater than the size of the vehicle, the vehicle 100 may determine that the full-shoulder stop is possible, and the vehicle may determine whether the liability for the accident is in the own vehicle when the full-shoulder stop is performed in a step 1007. For example, the vehicle 100 may calculate a driving path for fulfillment of the full-shoulder stop, and may calculate a safe distance to at least one neighboring vehicle related to the calculated driving path. The at least one neighboring vehicle related to the driving path for the full-shoulder stop fulfillment may include at least one of a vehicle on a front-lateral side, a side vehicle, and/or a vehicle on a rear-lateral side. The vehicle 100 may determine the possibility of a collision with at least one neighboring vehicle and whether or not to be liable for the accident based on the calculated safe distance. The safe distance to at least one neighboring vehicle may include the longitudinal safe distance and the lateral safe distance as shown in Equations 1.1 and 1.2. If the calculated longitudinal safe distance and lateral safe distance are both negative numbers, the vehicle 100 is highly likely to collide with at least one neighboring vehicle when the full-shoulder stop is performed, and may determine that the liability for the accident is in the own vehicle when a collision with the vehicle occurs. If at least one of the calculated longitudinal safe distance or lateral safe distance is a positive number, the vehicle may determine that the possibility of the vehicle 100 to collide with at least one neighboring vehicle during fulfillment of the full-shoulder stop is low, and the liability for the accident if a collision with the vehicle occurs is not in the own vehicle.

When it is determined that the liability for the accident is not in the own vehicle during fulfillment of the full-shoulder stop, the vehicle 100 may select the full-shoulder stop as the final MRM strategy in a step S1009.

When it is determined that the liability for the accident is in the own vehicle when the full-shoulder stop is performed, the vehicle 100 may proceed to a step S1011 to determine whether the liability for the accident is in the own vehicle when the half-shoulder stop is performed. For example, the vehicle 100 may calculate a driving path for fulfillment of the half-shoulder stop, and may calculate a safe distance to at least one neighboring vehicle related to the calculated driving path. The at least one neighboring vehicle related to the driving path for fulfillment of the half-shoulder stop may include at least one of a vehicle on a rear-lateral side, a side vehicle, and/or a rear vehicle. The vehicle 100 may determine the possibility of a collision with at least one neighboring vehicle and whether or not to be liable for the accident based on the calculated safe distance. The safe distance to at least one neighboring vehicle may include the longitudinal safe distance and the lateral safe distance as shown in Equations 1.1 and 1.2. If the calculated longitudinal safe distance and lateral safe distance are both negative numbers, the vehicle 100 is highly likely to collide with at least one neighboring vehicle when the half-shoulder stop is performed, and may determine that the liability for the accident is in the own vehicle when a collision with the vehicle occurs. If at least one of the calculated longitudinal safe distance or lateral safe distance is a positive number, the vehicle may determine that the possibility of the vehicle 100 to collide with at least one neighboring vehicle during fulfillment of the half-shoulder stop is low, and the liability for the accident if a collision with the vehicle occurs is not in the own vehicle.

When it is determined that the liability for the accident is not in the own vehicle during fulfillment of the half-shoulder stop, the vehicle 100 may select the half-shoulder stop as the final MRM strategy in a step S1013.

When it is determined that the liability for the accident is in the own vehicle when the half-shoulder stop is performed, the vehicle 100 may proceed to a step S1017.

As described above, when the vehicle according to various embodiments of the present disclosure detects a situation in which normal autonomous driving is impossible during the autonomous driving, the vehicle may determine the MRM strategy in consideration of liability for an accident per MRM type based on the vehicle state information and/or surrounding environment information, thereby safety can be improved while minimizing the risk of the vehicle.

What is claimed is:

1. A vehicle for autonomous driving, the vehicle comprising:

at least one sensor configured to detect a surrounding environment of the vehicle and generating surrounding environment information;

a processor configured to monitor a state of the vehicle to generate vehicle state information and control autonomous driving of the vehicle; and a controller configured to control operation of the vehicle based on the processor, wherein the processor is configured to:

detect whether a minimum risk maneuver (MRM) is required based on at least one of the surrounding environment information or the vehicle state information during autonomous driving of the vehicle, determine an MRM type based on a possibility of colliding with a neighboring vehicle when the MRM is required, check possibility of lateral control based on the vehicle state information, wherein checking possibility of lateral control includes possibility of lane detection, determine a straight stop type as the MRM type to be performed based on the lane detection being impossible, and control to stop the vehicle based on the determined MRM type.

2. The vehicle of claim 1, wherein when the MRM is required, the processor is configured to determine a plurality of MRM types based on the vehicle state information and the surrounding environment information, wherein when the plurality of MRM types are determined, the processor is configured to determine the possibility of colliding with the neighboring vehicle with respect to a first MRM type having a highest priority among the plurality of MRM types, wherein when it is determined that there is no possibility of colliding with the neighboring vehicle, the processor is configured to determine the first MRM type as the MRM type to be performed, and wherein when it is determined that there is the possibility of colliding with the neighboring vehicle, the processor is configured to determine another MRM type having a lower priority than the first MRM type as the MRM type to be performed.

3. The vehicle of claim 2, wherein the processor is configured to:

calculate a longitudinal safe distance and a lateral safe distance to the neighboring vehicle, and determine the possibility of colliding with the neighboring vehicle based on the longitudinal safe distance and the lateral safe distance, wherein the longitudinal safe distance is calculated as a difference between a minimum longitudinal relative distance to be maintained to the neighboring vehicle and an actual longitudinal relative distance to the neighboring vehicle, and wherein the lateral safe distance is calculated as a difference between a minimum lateral relative distance to be maintained to the neighboring vehicle and an actual lateral relative distance to the neighboring vehicle.

4. The vehicle of claim 3, wherein the neighboring vehicle is located in front of or on a front-lateral side of the vehicle.

5. The vehicle of claim 4, wherein the minimum longitudinal relative distance and the minimum lateral relative distance to be maintained to the neighboring vehicle located in front or on the front-lateral side of the vehicle is set greater than the minimum longitudinal relative distance and the minimum lateral relative distance to be maintained to the neighboring vehicle located on a rear side or on a rear-lateral side of the vehicle.

6. The vehicle of claim 3, further comprising:

a memory, wherein the processor is configured to store the calculated longitudinal safe distance and lateral safe distance in the memory as base data for determining the MRM type to be performed.

7. The vehicle of claim 2, wherein the processor is configured to determine the MRM type to be performed within a designated range based on the vehicle state information and the surrounding environment information.

8. The vehicle of claim 7, wherein when the lateral control is possible, the processor is configured to determine the MRM type to be performed based on at least one of a presence of a shoulder of a road within the designated range, a size of the shoulder of the road, or the possibility of lane detection.

9. The vehicle of claim 8, wherein the processor is configured to:

determine whether the lane detection is possible, when there is no shoulder of the road within the designated range;

and determine an in-lane stop and the straight stop type as the MRM types to be performed, when the lane detection is possible.

10. The vehicle of claim 9, wherein the processor is configured to:

compare the size of the shoulder of the road with a size of the vehicle when there is the shoulder of the road within the designated range;

determine a half-shoulder stop type, the in-lane stop type and the straight stop type as the MRM types to be performed when the size of the shoulder of the road is smaller than the size of the vehicle; and determine a full-shoulder stop type, the half-shoulder stop type, the in-lane stop type and the straight stop type as the MRM types to be performed when the size of the shoulder of the road is smaller than the size of the vehicle.

11. The vehicle of claim 8, further comprising:

a memory, wherein the processor is configured to store information of at least one among the possibility of the lateral control, the presence of the shoulder of the road, the size of the shoulder of the road, or the possibility of lane detection in the memory.

12. A method for operating a vehicle for autonomous driving, the method comprising:

obtaining surrounding environment information by detecting surrounding environment of the vehicle during autonomous driving of the vehicle;

obtaining vehicle state information by monitoring a state of the vehicle during autonomous driving of the vehicle;

detecting whether a minimum risk maneuver (MRM) is required based on at least one of the surrounding environment information or the vehicle state information during the autonomous driving of the vehicle;

determining an MRM type based on a possibility of colliding with a neighboring vehicle when the MRM is required;

checking possibility of lateral control based on the vehicle state information, wherein checking possibility of lateral control includes possibility of lane detection, determining a straight stop type as the MRM type to be performed based on the lane detection being impossible, and controlling the vehicle to stop based on the determined MRM type.

13. The method of claim 12, wherein the determining the MRM type comprises:

determining the MRM type to be performed based on the vehicle state information and the surrounding environment information;

when a plurality of MRM types are possible, determining the possibility of colliding with the neighboring vehicle with respect to a first MRM type having a highest priority of the plurality of MRM types;

when it is determined that there is no possibility of colliding with the neighboring vehicle, determining the first MRM type as the MRM type to be performed; and when it is determined that there is the possibility of colliding with the neighboring vehicle, determining another MRM type having a lower priority than the first MRM type as the MRM type to be performed.

14. The method of claim 13, wherein determining the possibility of colliding with the neighboring vehicle comprises:

calculating a longitudinal safe distance and a lateral safe distance to the neighboring vehicle; and determining the possibility of colliding with the neighboring vehicle based on the longitudinal safe distance and the lateral safe distance, wherein the longitudinal safe distance is calculated as a difference between a minimum longitudinal relative distance to be maintained to the neighboring vehicle and an actual longitudinal relative distance to the neighboring vehicle, and wherein the lateral safe distance is calculated as a difference between the minimum lateral relative distance to be maintained to the neighboring vehicle and an actual lateral relative distance to the neighboring vehicle.

15. The method of claim 13, wherein determining the MRM type to be performed based on the vehicle state information and the surrounding environment information comprises:

determining the MRM type to be performed within a designated range based on the vehicle state information and the surrounding environment information.

16. The method of claim 15, further comprising:

when the lateral control is possible, determining the MRM type to be performed based on at least one of presence of a shoulder of a road within the designated range, a size of the shoulder of the road, or the possibility of lane detection.

17. The method of claim 16, wherein determining the MRM type to be performed based on the at least one of the presence of the shoulder of the road within the designated range, the size of the shoulder of the road, or the possibility of lane detection comprises:

determining whether the lane detection is possible, when there is no shoulder of the road within the designated range; and determining an in-lane stop and the straight stop type as the MRM types to be performed, when the lane detection is possible.

18. The method of claim 17, further comprising:

comparing the size of the shoulder of the road with a size of the vehicle when there is the shoulder of the road within the designated range;

determining a half-shoulder stop type, the in-lane stop type and the straight stop type as the MRM types to be performed when the size of the shoulder of the road is smaller than the size of the vehicle; and determining a full-shoulder stop type, the half-shoulder stop type, the in-lane stop type and the straight stop type as the MRM types to be performed when the size of the shoulder of the road is smaller than the size of the vehicle.

* * * * *